US006763459B1

(12) United States Patent
Corella

(10) Patent No.: US 6,763,459 B1
(45) Date of Patent: Jul. 13, 2004

(54) LIGHTWEIGHT PUBLIC KEY INFRASTRUCTURE EMPLOYING DISPOSABLE CERTIFICATES

(75) Inventor: Francisco Corella, Hayward, CA (US)

(73) Assignee: Hewlett-Packard Company, L.P., Houston, TX (US)

(*) Notice: Subject to any disclaimer, the term of this patent is extended or adjusted under 35 U.S.C. 154(b) by 0 days.

(21) Appl. No.: 09/483,356

(22) Filed: Jan. 14, 2000

(51) Int. Cl.$^7$ ................................................ G06F 1/24
(52) U.S. Cl. ........................ 713/156; 713/175; 713/182; 713/200; 713/201
(58) Field of Search ................................ 713/156, 175, 713/182, 200, 201

(56) References Cited

U.S. PATENT DOCUMENTS

| | | | |
|---|---|---|---|
| 4,881,264 A | | 11/1989 | Merkle |
| 5,210,795 A | | 5/1993 | Lipner et al. |
| 5,224,163 A | | 6/1993 | Gasser et al. |
| 5,276,901 A | | 1/1994 | Howell et al. |
| 5,793,868 A | | 8/1998 | Micali |
| 5,796,841 A | | 8/1998 | Cordery et al. |
| 5,982,898 A | | 11/1999 | Hsu et al. |
| 5,996,076 A | * | 11/1999 | Rowney et al. ............. 713/201 |
| 6,023,506 A | | 2/2000 | Ote et al. |
| 6,029,150 A | * | 2/2000 | Kravitz ........................ 705/39 |
| 6,044,462 A | | 3/2000 | Zubeldia et al. |
| 6,058,484 A | | 5/2000 | Chapman et al. |
| 6,092,201 A | | 7/2000 | Turnbull et al. |
| 6,202,151 B1 | | 3/2001 | Musgrave et al. |
| 6,212,636 B1 | | 4/2001 | Boyle et al. |
| 6,253,322 B1 | | 6/2001 | Susaki et al. |
| 6,263,446 B1 | | 7/2001 | Kausik et al. |
| 6,324,645 B1 | | 11/2001 | Andrews et al. |
| 6,327,578 B1 | | 12/2001 | Linehan |
| 6,393,563 B1 | | 5/2002 | Maruyama et al. |
| 6,484,259 B1 | | 11/2002 | Barlow |
| 2002/0143710 A1 | | 10/2002 | Liu |

FOREIGN PATENT DOCUMENTS

| | | |
|---|---|---|
| WO | WO9919845 | 4/1999 |
| WO | WO9935783 | 7/1999 |
| WO | WO 99/35783 | 7/1999 |
| WO | WO 01/43344 | 6/2001 |

OTHER PUBLICATIONS

M. Boe et al., "TLS–Based Telnet Security," Internet Engineering Task Force, Internet Draft, pp. 1–20, (Updated Version Oct. 24, 2000, Previous Version Sep. 1998). <http://www.normos.org/ietf/draft/draft–ietf–tn3270e–telnet–tls–05.txt>.

(List continued on next page.)

Primary Examiner—Thomas R. Peeso

(57) ABSTRACT

A PKI includes an off-line registration authority that issues a first unsigned certificate to a subject that binds a public key of the subject to long-term identification information related to the subject and maintains a certificate database of unsigned certificates in which it stores the first unsigned certificate An on-line credentials server issues a short-term disposable certificate to the subject that binds the public key of the subject from the first unsigned certificate to the long-term identification information related to the subject from the first unsigned certificate. The credentials server maintains a table that contains entries corresponding to valid unsigned certificates stored in the certificate database. The subject presents the short-term disposable certificate to a verifier for authentication and demonstrates that the subject has knowledge of a private key corresponding to the public key in the short-term disposable certificate.

51 Claims, 15 Drawing Sheets

OTHER PUBLICATIONS

D. Borman, "Telnet Authentication Option," Netw ork Working Group, Request for Comments: 1416, pp. 1–7, (Feb. 1993). <http://www.csl.sony.co.jp/rfc/>.

M. Carpenter et al., "Securing FTP with TLS," Internet Engineering Task Force, Internet Draft, pp. 1–23, (Jan. 28, 1998). <http://war.jgaa.com/ftp/draft/draft–murray–auth–ftp–ssl–03.txt>.

C. Ellison et al., "SPKI Certificate Theory," Network Working Group, Request for Comments: 2693, pp. 1–43, (Updated Version Sep. 1999, Previous Version Nov. 17, 1998). <http://www.csl.sony.co.jp/rfc/>.

S. Farrell, "TLS Extensions for AttributeCertificate Based Authorization," Transport Layer Security Working Group, Internet Engineering Task Force, Internet Draft, pp. 1–11, (Aug. 20, 1998). <http://www.alternic.org/draft/draft–ietf–tls–attr–cert–01.txt>.

M. Horowitz et al., "FTP Security Extensions," Netw orking Working Group, Request for Comments: 2228, pp. 1–27, (Oct. 1997). <http://www.csl.sony.co.jp/rfc/>.

R. Housley et al., "FTP Authentication Using DSA," CAT Working Group, Internet Engineering Task Force, Internet Draft, pp. 1–8, (Feb. 1998). <http://www.alternic.org/draft/draft/ieft–cat–ftpdsaauth–0.2.txt>.

R. Housley et al., "Telnet Authentication Using DSA," Secure Telnet Working Group, Internet Engineering Task Force, Internet Draft, 7 pages, (Jul. 1998). <http://www.alternic.org/draft/draft/housley–telnet–auth–dsa–02.txt.

J. Kohl et al., "The Kerberos Netw ork Authentication Service (V5)," Network Working Group, Request for Comments: 1510, pp. 1–112, (Sep. 1993). <http://www.csl.sony.co.jp/rfc/>.

S. Micali, "Efficient Certificate Revocation," Massachusetts Institute of Technology, Laboratory for Computer Science, pp. 1–10 (Mar. 22, 1996).

M. Myers et al., "X.509 Internet Public Key Infrastructure Online Certificate Status Protocol–OCSP," Netw ork Working Group, Request for Comments: 2560, pp. 1–22, (Jun. 1999). <http://www.csl.sony.co.jp/rfc/>.

M. Naor et al., "Certificate Revocation and Certificate Update," USENIX Association, Seventh USENIX Security Symposium, pp. 217–228, (Jan. 26–29, 1998).

C. New man, "Telnet SASL Option," Network Working Group, Internet Engineering Task Force, Internet Draft, 6 pages, (Nov. 1998). <http://globecom.net/ietf/draft/draft–new man–telnet–sasl–01.html>.

E. Rescorla, "HTTP Over TLS," Internet Engineering Task Force, Internet Draft, pp. 1–6, (Sep. 1998). <http://www.alternic.org/draft/draft–ietf–tls–https–02.txt>.

RSA Security Inc., "RSA Keon Advanced PKI: A Security Architecture for Enabling E–Business," Solution White Paper, pp. 1–14, (1999). <http://www.rsasecurity.com/products/keon/w hitepapers/advpkiw p/rsa_keon_advanced_pki_w p.pdf>.

RSA Security Inc., "Security Services Provided by the RSA Keon Desktop v5.1," White Paper, pp. 1–8, (1999). <http://www.rsasecurity.com/products/keon/whitepapers/desktop/keon_desktop_w p.pdf>.

B. Tung et al., "Public Key Cryptography for Initial Authentication in Kerberos," Internet Engineering Task Force, Internet Draft, 21 pages (Expires May 15, 1999) <http://www.alternic.org/draft/draft–ietf–cat–kerberos–pk–init–07.txt>.

Web Page of the "Simple Public Key Infrastructure (spki)," Working Group, 2 pages, (Last Modified Jan. 16, 2001), <http://www.ietf.org/html.charters/spki–charter.html>.

Web Page of the "Transport Layer Security (tls)," Working Group, 2 pages, (Last Modified Mar. 30, 2001), <http://www.ietf.org/html.charters/tls–charters.html>.

International Telecommunication Union (ITU–T) Recommendation X.509, "Information Technology Open Systems Interconnection, The Directory: Authentication Framework," pp. i–81 (Jun. 1997).

R. Rivest, "Can We Eliminate Certificate Revocation Lists?," MIT Laboratory for Computer Science, pp. 178–183, (Feb. 1998). <http://theory.lcs.mit.edu/rivest>.

Menezes, "Handbook of Applied Cryptography," pp. 33, 37–39, 321–322, 559–560, 576–577, (1997).

A copy of PCT International Search Report for International Application No. PCT/US01/01520 mailed on Aug. 10, 2001 (8 pages).

Press, Jim, "Secure Transfer of Identity and Privilege Attributes in an Open Systems Environment," Computers & Security, vol. 10, No. 2., pp. 117–127, (Apr. 1991).

"SET Secure Electronic Transaction Specification," Book 1: Business Description, Version 1.0, XP–002203148, pp. i–72, (May 31, 1997).

A partial copy of European Search Report for Application No. EP 00 31 0771 mailed on Jul. 12, 2002 (4 pages).

Menezes, et al: "Handbook of Applied Cryptograph"; Boca Raton, FL, CRC Press, US, 1997; XP002173298; p. 39, line 1–line 38; p. 559, line 7; p. 560, line 28; p. 576, line 18; p. 577, line 37.

Rivest, R.L.: "Can We Eliminate Certificate Revocation Lists?"; Financial Cryptograph, International Conference; Feb., 1998, XP000997964; pp. 178–183.

Encryption Plus Folders, Encryption Plus Folders. Enterprise. 2002.

Moeller, Michael. Digital IDs: offering expanded view of users: Verisign's next Digital certificates extend electronic ID's to include personal Data. PC Week. Zipp–Davis Publishing Co. Feb. 3, 1997.

Foster, Ian. A Security Architecture for Computational Grids. ACM. San Francisco CA, 1998.

Wheeler, Lynn. Three Digital Signature Models . . . for x9.59. Nov. 28, 1997.

Stephen Cobb. Netw ork World. Framingham: Jul. 7, 1997. vol. 14, Iss. 27; p. 53, 3 pgs.

* cited by examiner

LIGHTWEIGHT PUBLIC KEY INFRASTRUCTURE EMPLOYING DISPOSABLE CERTIFICATES

CROSS REFERENCE TO RELATED APPLICATIONS

This patent application is related to the following Non-Provisional U.S. patent application Ser. No. 09/483,185, entitled "AUTHORIZATION INFRASTRUCTURE BASED ON PUBLIC KEY CRYPTOGRAPHY," having Ser. No. 09/483,189, entitled "METHOD AND APPARATUS FOR PROVIDING FIELD CONFIDENTIALITY IN DIGITAL CERTIFICATES," having; and Ser. No. 09/483,186, entitled "LIGHTWEIGHT PUBLIC KEY INFRASTRUCTURE EMPLOYING UNSIGNED CERTIFICATES," having, and the following Provisional U.S. Patent application Ser. No. 60/176,157, entitled "PUBLIC KEY VALIDATION SERVICE," having, which are all filed on even date herewith, are all assigned to the same assignee as the present application, and are all herein incorporated by reference.

THE FIELD OF THE INVENTION

The present invention relates to public key cryptosystems, and more particularly, to a public key infrastructure employing disposable short-term certificates for authentication and/or authorization.

BACKGROUND OF THE INVENTION

Public key cryptosystems are globally deployed on the World Wide Web, as well as on a growing number of enterprise networks, for establishment of secure communication channels. Every user in a public key cryptosystem has a pair of keys including a public key and a private key. The public key is disclosed to other users while the private key is kept secret. A public key cryptosystem typically has a primary designed use, such as for encryption, digital signature, or key agreement. Public key cryptosystems are also used for user authentication. For example, a user can authenticate itself to other users by demonstrating knowledge of its private key, which other users can verify using the corresponding public key.

In an application of a public key cryptosystem for authenticating a user, the public key must be securely associated with the identity of the user that owns the public key by authenticating the public key itself. Public key certificates are typically employed to authenticate the public key. A public key certificate is a digital document, signed by a certificate authority, that binds a public key with one or more attributes that uniquely identify the owner of the public key. The public key certificate can be verified using the certificate authority's public key, which is assumed to be well known or is recursively certified by a higher authority. For example, in a corporation, a public key certificate can bind a public key to an employee number.

A public key infrastructure (PKI) refers to the collection of entities, data structures, and procedures used to authenticate public keys. A traditional PKI comprises a certificate authority, public key certificates, and procedures for managing and using the public key certificates.

One type of a user of a PKI owns the public key contained in a public key certificate and uses the certificate to demonstrate the user's identity. This type of user is referred to as the subject of the certificate or more generally as the subject. Another type of user relies on a public key certificate presented by another user to verify that the other user is the subject of the certificate and that the attributes contained in the certificate apply to the other user. This type of user that relies on the certificate is referred to as a verifier or relying party.

The association between a public key and an identity can become invalid because the attributes that define the identity no longer apply to the owner of the public key, or because the private key that corresponds to the public key has been compromised. A PKI typically employs two complementary techniques for dissociating a public key from an identity. In the first technique, each public key certificate has a validity period defined by an expiration date, which is a substantial period from the issue date, such as one year from the issue date. In the second technique, the certificate authority revokes a public key certificate if the public key certificate's binding becomes invalid before the expiration date. One way of revoking a public key certificate is by including a serial number of the public key certificate in a certificate revocation list (CRL), which is signed and issued by the certificate authority at known periodic intervals, such as every few hours or once a day. An entity that relies on a certificate is responsible for obtaining the latest version of the CRL and verifying that the serial number of the public key certificate is not on the list.

CRLs typically become quite long very quickly. When the CRLs become long, performance is severely impacted. First, CRL retrieval consumes large amounts of network bandwidth. Second, each application has to retrieve the CRL periodically, parse the CRL, and allocate storage for the CRL. Then, the application needs to carry out a linear search of the CRL for the public key certificate serial number when the application verifies each public key certificate. As a result, conventional PKIs do not scale beyond a few thousand users.

One solution proposed to alleviate the linear search problem is to partition CRLs. The serial number of the public key certificate determines where the CRL partition is located when the public key certificate is revoked. With partitioned CRLs, the application still has to retrieve and store the entire CRL or else the application needs to fetch a CRL partition in order to verify a certificate. Since certificate verification is a likely critical path, fetching a CRL partition impacts the time it takes to run the application.

An on-line certificate status protocol (OCSP) operates by permitting the verifier of the public key certificate to ask the certificate authority if the certificate is currently valid. The certificate authority responds with a signed statement. The OCSP allows CRLs to be avoided, but requires the verifier to query the certificate authority as part of the transaction that employs the public key certificates. The verifier querying the certificate authority increases the time it takes to perform the transaction. The OCSP scheme is highly vulnerable to a denial-of-service attack, where the attacker floods the certificate authority with queries. Responding to each query is computationally expensive, because each response requires a digital signature.

In a certificate status proofs scheme, the certificate authority maintains a data structure describing the set of valid and invalid certificates in the directory. For every public key certificate that has not yet expired, a short cryptographic proof can be extracted from the data structure of the certificate's current status (i.e., valid or invalid). A CRL can essentially be viewed as a cryptographic proof of invalidity for the public key certificates in the CRL, and proof of validity for those not in the CRL. The CRL, however, is not a short proof. The short cryptographic proof can be obtained by the verifier from the directory, or it can be obtained by the subject and presented to the verifier together with the public key certificate.

The Simple Public Key Infrastructure (SPKI) working group of the Internet Society and the Internet Engineering Task Force has proposed the possibility of employing short-lived certificates as a method of achieving fine-grain control over the validity interval of a certificate. See C. M. Ellison, B. Frantz, B. Lampson, R. Rivest, B. M. Thomas and T. Ylonen, *SPKI Certificate Theory*, Request for Comments 2560 of the Internet Engineering Task Force, September 1999. The *SPKI certificate theory* reference states that there are cases in which a short-lived certificate requires fewer signatures and less network traffic than various on-line test options. The use of a short-lived certificate always requires fewer signature verifications than the use of a certificate plus on-line test result.

Nevertheless, no practical method of issuing short-lived certificates has been proposed. Traditional certificates are issued off-line, as part of a process that includes subject registration, at the rate of one per year per user. By contrast, short-lived certificates would have to be issued on-line at the rate of at least one per day per user, and perhaps as often as one every few minutes for every user.

The term on-line and the term off-line have particular definitions in the context of a PKI. The term on-line herein refers to the day-to-day usage of public key certificates and key pairs for authentication. The term off-line herein refers to the more infrequent establishment or dissolution of public key bindings, which may result in the issuing or revocation of public key certificates. For example, the traditional certificate authority is off-line, issues CRLs off-line, and places the CRLs in a directory for on-line retrieval. The scheme involving certificate status proofs also makes use of off-line certificate authorities. The OCSP is the only scheme described above that employs an on-line certificate authority.

For reasons stated above and for other reasons presented in greater detail in the Description of the Preferred Embodiment section of the present specification, there is a need for an improved lightweight PKI that overcomes the above-described revocation problems and efficiently scales well beyond a few thousand users, and which can be employed for authentication and/or authorization.

SUMMARY OF THE INVENTION

The present invention provides a public key infrastructure (PKI) including a subject, an on-line registration authority, an off-line credentials server, and a verifier. The registration authority issues a first unsigned certificate off-line to the subject that binds a public key of the subject to long-term identification information related to the subject. The registration authority maintains a certificate database of unsigned certificates in which it stores the first unsigned certificate. The credentials server issues a short-term disposable certificate on-line to the subject. The short-term disposable certificate binds the public key of the subject from the first unsigned certificate to the long-term identification information related to the subject from the first unsigned certificate. The credentials server maintains a table that contains entries corresponding to valid unsigned certificates stored in the certificate database. The subject presents the short-term disposable certificate to the verifier for authentication and demonstrates that the subject has knowledge of a private key corresponding to the public key in the short-term disposable certificate.

DESCRIPTION OF THE PREFERRED EMBODIMENTS

Figure 1:
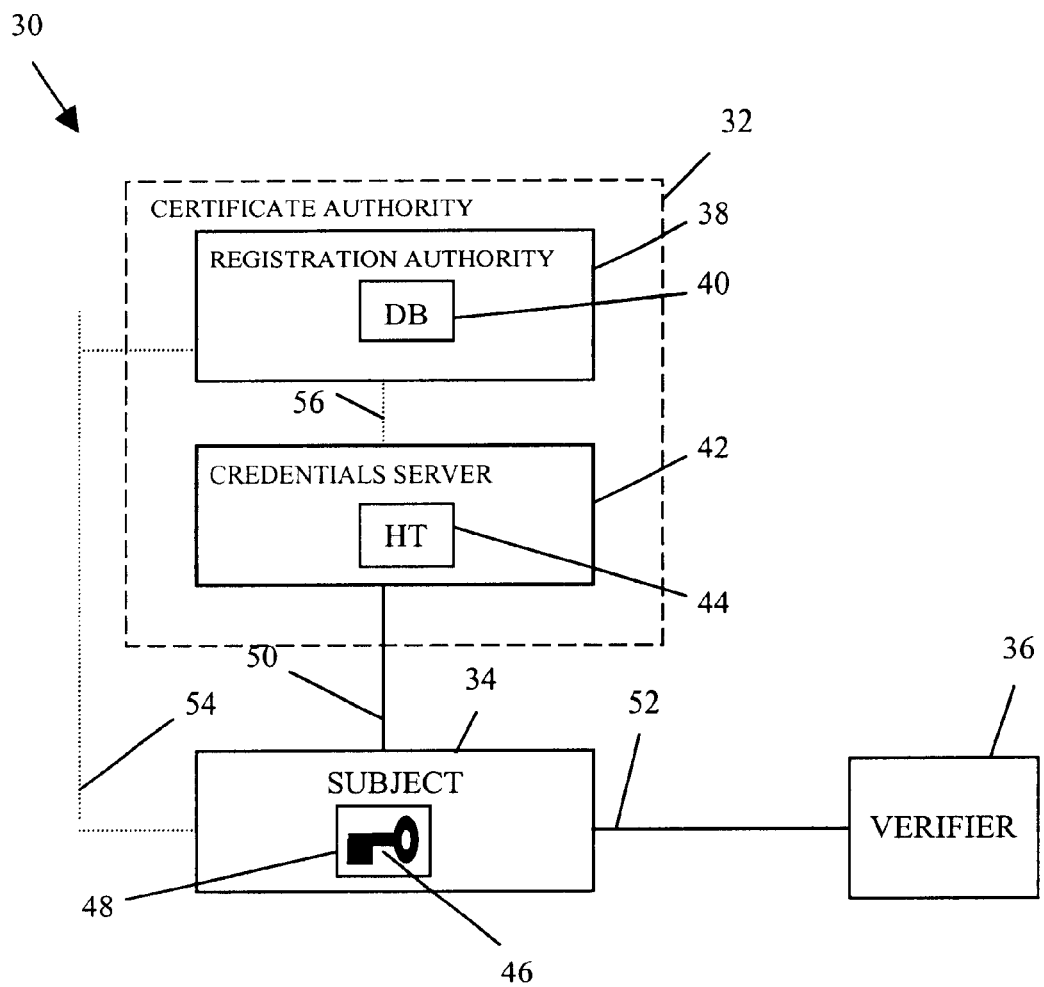
FIG. 1 is a block diagram of a light-weight public key infrastructure (PKI) according to the present invention employing short-term disposable certificates.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A light-weight public key infrastructure (PKI) according to the present invention is illustrated generally at 30 in FIG.

1. PKI 30 includes several main components which are each a software program. The main software program components of PKI 30 run on one or more computer systems. In one embodiment, each of the main software program components runs on its own computer system.

A certificate authority 32 issues short-term disposable certificates to one or more subjects, such as subject 34. Subject 34 is a user which owns a public key contained in the short-term disposable certificate and uses the short-term disposable certificate to demonstrate the subject's identity to one or more verifiers, such as verifier 36, by demonstrating that the subject has knowledge of a private key corresponding to the public key in the short-term disposable certificate. Verifier 36 is a user which relies on the short-term disposable certificate presented by subject 34 to verify that subject 34 is the subject of the short-term disposable certificate and that the attributes contained in the short-term disposable certificate apply to subject 34. In some embodiments of PKI 30, the same user can play the role of subject 34 and verifier 36 in different situations.

PKI 30 does not issue traditional long-term certificates, such as issued by conventional PKIs. Traditional long-term certificates typically have a validity period defined by an expiration date, which is a substantial period from the issue date, such as one year from the issue date. A conventional certificate authority needs to revoke a traditional long-term certificate if the public key certificate binding becomes invalid before the expiration date. As discussed in the Background of the Invention section of the present specification, a variety of methods have been used to revoke traditional long-term certificates, such as by using a certificate revocation list (CRL) or an on-line certificate status protocol (OCSP).

By contrast to traditional long-term certificates, the short-term disposable certificates issued by certificate authority 32 according to the present invention are not subject to revocation. The short-term disposable certificates are referred to as being disposable, because subject 34 can throw them away after a few uses. As a result, in one embodiment of the present invention, the short-term disposable certificates are stored in volatile memory and are not saved to a disk. PKI 30 is referred to as being a lightweight PKI because it is substantially simpler and more efficient than a conventional PKI.

A short-term disposable certificate is herein defined as a public key certificate that binds the subject's public key to one or more names or identifiers and has a short validity period determined by an expiration date/time. An example validity period for a short-term disposable certificate is one day, a few hours, or even a few minutes. Since the validity period is quite short, revocation is not necessary. Subject 34 requests a fresh short-term disposable certificate as needed and submits it to verifier 36. Verifier 36 only needs to check the expiration date/time to verify that the short-term disposable certificate is valid.

From the point of view of verifier 36, the use of short-term disposable certificates is a much better scheme than using traditional long-term certificates, because verifier 36 only has to verify a signature of the short-term disposable certificate and check the expiration date/time of the short-term disposable certificate. Since the certificate validation work of verifier 36 is likely to be a critical path in the overall work of verifier 36, short-term disposable certificates are a good solution for the verifier. In many cases, the verifier is a performance bottleneck and thus short-term disposable certificates are a good overall solution for PKI 30.

Certificate authority 32 includes a registration authority 38 that maintains a certificate database (DB) 40 containing unsigned certificates. Certificate authority 32 also includes a credentials server 42 that maintains a hash table (HT) 44 containing cryptographic hashes of unsigned certificates.

Registration authority 38 is an off-line component of certificate authority 32 and is responsible for subject registration and for maintaining certificate database 40. Each unsigned certificate in certificate database 40 binds a public key of a subject to one or more attributes that uniquely identify the subject.

Credentials server 42 is an on-line component of certificate authority 32 and is responsible for issuing the short-term disposable certificates and for maintaining the list of cryptographic hashes of currently valid unsigned certificates in hash table 44. Each cryptographic hash in hash table 44 is computed from an unsigned certificate using an agreed upon collision-resistant hash function, such as SHA-1 or MD5. Hash table 44 is essentially a list of the currently valid unsigned certificates which is keyed by the cryptographic hash. Cryptographic hashes function well as keys for hash table 44, because cryptographic hashes behave statically as random quantities.

Subject 34 has a private-key 46 stored in a secure storage medium 48, such as a smartcard or secure software wallet. Subject 34 also has a public key mathematically associated with private key 46. Subject 34 registers the public key corresponding to private key 46 with registration authority 38 by sending the public key and one or more attributes that uniquely identify subject 34's identity to registration authority 38 and demonstrating that the identification attributes apply to subject 34. Examples of such identification attributes include name, social security number, and employee number.

The components of PKI 30 are linked by one or more computer networks. A network connection 50 couples credentials server 42 and subject 34. A network connection 52 couples subject 34 and verifier 36. Network connections 50 and 52 are shown as solid lines in FIG. 1 and are used for on-line communications. A network connection 54 couples registration authority 38 and subject 34. A network connection 56 couples registration authority 38 and credentials server 42. Network connections 54 and 56 are represented as dotted lines in FIG. 1 and are used for off-line communications. Registration authority 38 is only involved in off-line communications and communicates through off-line network connections 54 and 56. On the other hand, credentials server 42 is involved in on-line communications through network connection 50.

Figure 2:
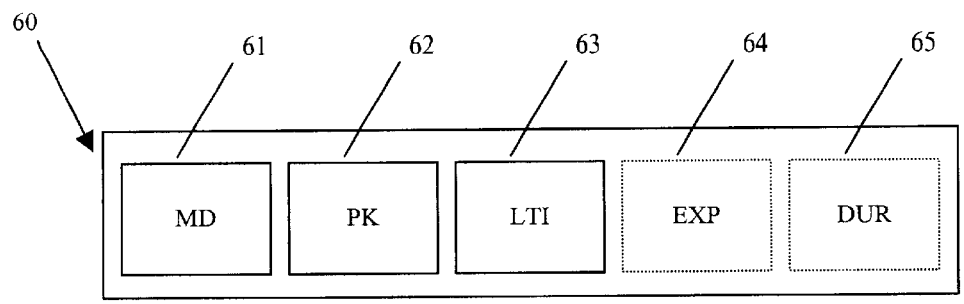
FIG. 2 is a diagram of an unsigned certificate issued from a registration authority of the PKI of FIG. 1.

One embodiment of an unsigned certificate issued by registration authority 38 is illustrated generally at 60 in FIG. 2. Unsigned certificate 60 includes a meta-data (MD) field 61 containing data about unsigned certificate 60 itself rather than data related to the subject. Examples of data stored in meta-data field 61 include serial number and issuer name. Unsigned certificate 60 includes a subject's public key (PK) 62. Unsigned certificate 60 includes long-term identification information (LTI) field 63 containing attributes uniquely identifying subject 34, such as the subject's name, the subject's social security number, or the subject's employee number.

Unsigned certificate 60 optionally includes a long-term expiration (EXP) field 64 which contains a date/time of expiration for unsigned certificate 60. The expiration date/time contained in long-term expiration field 64 is useful for administrative purposes, but is not required for proper functioning of PKI 30. By contrast, in a conventional PKI, the expiration date is required to reduce the size of the CRL as revoked certificates reach their expiration dates. Unsigned certificate 60 optionally includes a duration (DUR) field 65 that specifies a duration for the validity period of any short-term disposable certificates issued against unsigned certificate 60.

Figure 3:
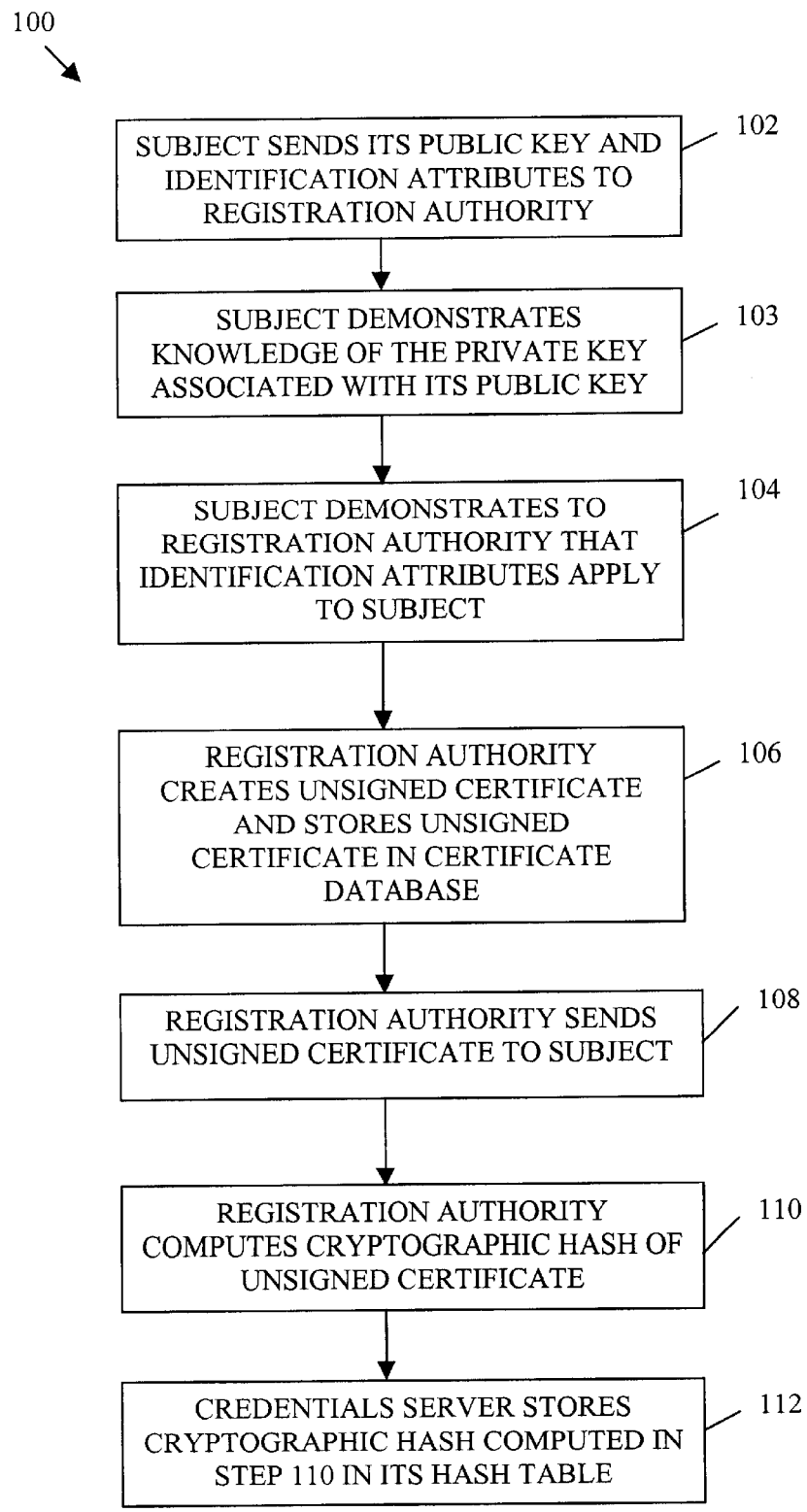
FIG. 3 is a flow diagram of an off-line protocol for issuing an unsigned certificate from a registration authority of the PKI of FIG. 1.

An off-line protocol for issuing unsigned certificate 60 from registration authority 38 is illustrated generally at 100 in FIG. 3. At step 102, subject 34 sends its public key and one or more attributes that uniquely identify subject 34 to registration authority 38.

At step 103, subject 34 demonstrates knowledge of the private key 46 associated with the subject 34's public key. Step 103, is performed in a way that depends on the cryptosystem for which the private-public key pair has been generated by subject 34. For example, in a digital signature cryptosystem, subject 34 demonstrates knowledge of the private key 46 by using private key 46 to digitally sign a quantity derived from a random quantity generated by registration authority 38. Registration authority 38 then verifies this digital signature using subject 34's public key.

At step 104, subject 34 demonstrates to registration authority 38, by out-of-band administrative means, that the identification attributes sent in step 102 apply to subject 34.

At step 106, registration authority 38 creates unsigned certificate 60 and stores unsigned certificate 60 in certificate database 40. At step 108, registration authority 38 sends unsigned certificate 60 to subject 34.

At step 110, registration authority 38 computes a cryptographic hash of unsigned certificate 60 using an agreed upon collision-resistant hash function, such as SHA-1 or MD5. In step 110, registration authority 38 sends the computed cryptographic hash of unsigned certificate 60 to credential server 42 over network connection 56, which provides data integrity protection, such as with a Secure Sockets Layer (SSL) connection.

At step 112, credentials server 42 stores the cryptographic hash of unsigned certificate 60 computed in step 110 in hash table 44.

Figure 4:
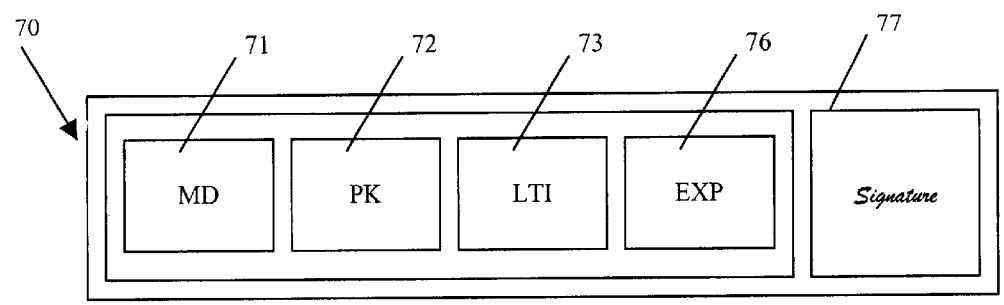
FIG. 4 is a diagram of a non-structured short-term disposable certificate as issued by a credentials server of the PKI of FIG. 1.

One embodiment of a short-term disposable certificate as issued by credentials server 42 is illustrated generally at 70 in FIG. 4. Short-term disposable certificate 70 includes a meta-data (MD) field 71 containing data about short-term disposable certificate 70 rather than the subject of short-term disposable certificate 70. Short-term disposable certificate 70 includes a public key (PK) 72 which is the same public key as public key 62 of unsigned certificate 60. The subject of unsigned certificate 60 and short-term disposable certificate 70 has only one private-public key pair associated with private key 46 stored in smartcard or secure software wallet 48. Short-term disposable certificate 70 includes long-term identification information (LTI) field 73 containing attributes uniquely identifying subject 34. Long-term identification information field 73 is identical to long-term identification information field 63 of unsigned certificate 60.

Short-term disposable certificate 70 also includes a short-term expiration (EXP) field 76 that specifies a date and time of expiration for a short-term disposable certificate 70. In one embodiment where unsigned certificate 60 contains a duration field 65 that specifies a duration for the validity period of the short-term disposable certificates issued therefrom, the date and time specified by short-term expiration field 76 is obtained by adding the duration specified by duration field 65 to the date and time at which short-term disposable certificate 70 is issued by credentials server 42.

In one embodiment, the duration of the validity period of short-term disposable certificate 70 is not explicitly specified by a duration field 65 in unsigned certificate 60. In this embodiment, the duration of the validity period of short-term disposable certificate 70 is set by a policy.

Short-term disposable certificate 70 also includes a signature field 77 containing a signature of credentials server 42. The signature in signature field 77 is made by credentials server 42 on the sequence of fields 71, 72, 73, and 74, as well as, if necessary, the specification of the cryptosystem that has been used to produce the signature and must be used to verify the signature.

In one embodiment, short-term disposable certificate 70 is implemented with an X.509v3 certificate.

Figure 5:
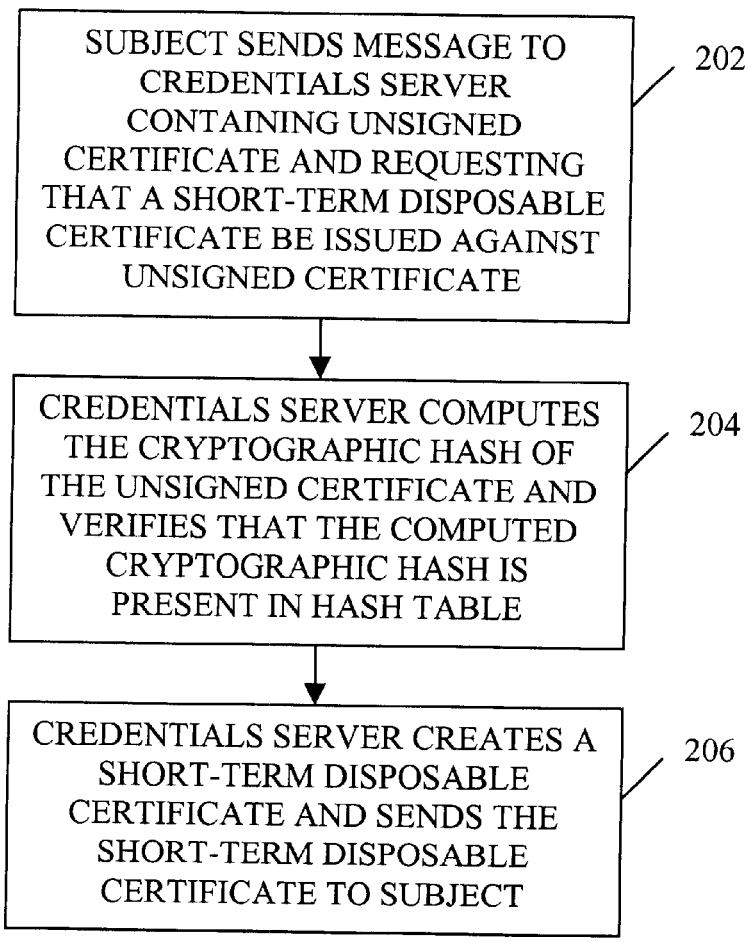
FIG. 5 is a flow diagram illustrating an on-line protocol for issuing a short-term disposable certificate from a credentials server of the PKI of FIG. 1.

An on-line protocol for issuing a short-term disposable certificate 70 to subject 34 from credentials server 42 against unsigned certificate 60 is generally illustrated at 200 in FIG. 5. At step 202, subject 34 sends a message to credentials server 42 containing unsigned certificate 60 and requesting that a short-term disposable certificate be issued against unsigned certificate 60.

At step 204, credentials server 42 computes a cryptographic hash of unsigned certificate 60 by the agreed upon collision-resistant hash function. In step 204, credentials server 42 then verifies that the computed cryptographic hash is present in hash table 44. At step 206, credentials server 42 creates short-term disposable certificate 70 and sends short-term disposable certificate 70 to subject 34.

In step 204, credentials server 42 performs the hash table 44 look-up with an efficient and computationally inexpensive operation. The signature operation performed by credentials server 42 in step 206 to create short-term disposable certificate 70, however, is a computationally expensive operation. Nevertheless, step 206 with the computationally expensive signature operation is only performed if the look-up of hash table 44 succeeds. The impact of a denial-of-service attack against credentials server 42 is reduced by only performing step 206 if the look-up in step 204 succeeds.

Figure 6:
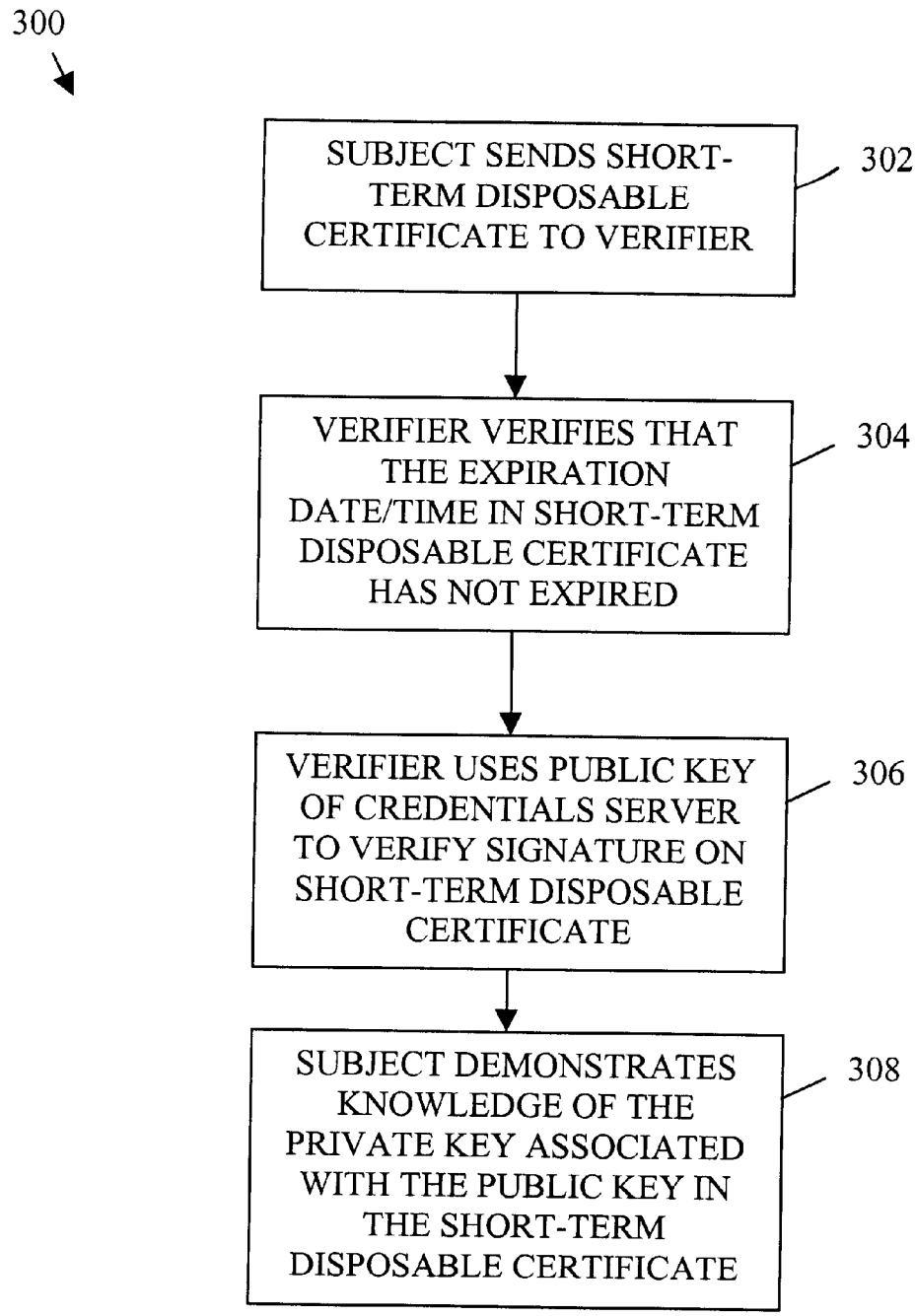
FIG. 6 is a flow diagram illustrating an on-line protocol for a subject to demonstrate its identity to a verifier of the PKI of FIG. 1.

An on-line protocol employed by subject 34 to demonstrate its identity to verifier 36 is illustrated generally at 300 in FIG. 6. At step 302, subject 34 sends the issued short-term disposable certificate 70 to verifier 36. At step 304, verifier 36 verifies that the expiration date and time specified in short-term expiration field 76 of short-term disposable certificate 70 has not been reached. At step 306, verifier 36 uses a public key of credentials server 42 to verify the signature in signature field 77 of short-term disposable certificate 70.

Verifier 36 knows the public key of credentials server 42 either directly or through certification by a higher certificate authority.

At step 308, subject 34 demonstrates knowledge of the private key 46 associated with the public key 72 contained in short-term disposable certificate 70. Step 308 is performed in a way that depends on the cryptosystem for which the private/public key pair has been generated by subject 34. For example, in a digital signature cryptosystem, subject 34 demonstrates knowledge of the private key 46 by using private key 46 to digitally sign a quantity derived from a random quantity generated by verifier 36. Verifier 36 then verifies this digital signature using the public key 72 in short-term disposable certificate 70.

Subject 34 can delete short-term disposable certificate 70 when the short-term disposable certificate expires, because subject 34 can obtain a new short-term disposable certificate by sending the unsigned certificate to credentials server 42.

In one embodiment subject 34 stores short-term disposable certificate in volatile memory and does not save it to disk.

Figure 7:
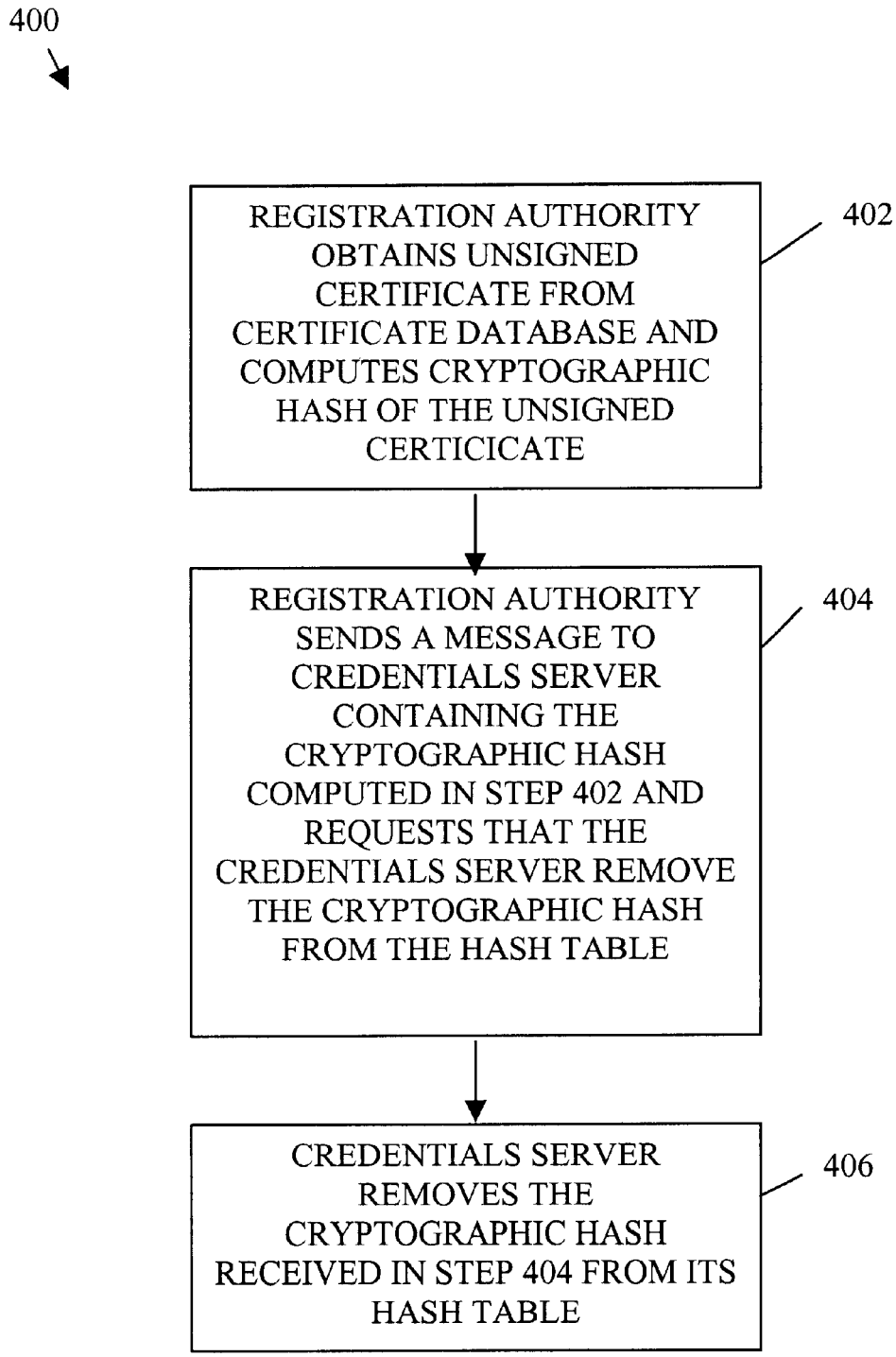
FIG. 7 is a flow diagram illustrating a protocol for a registration authority to revoke an unsigned certificate for the PKI of FIG. 1.

An off-line protocol for revoking unsigned certificate 60 is illustrated generally at 400 in FIG. 7. Off-line protocol 400 is performed when subject 34's private key 46 is compromised or the identification attributes in long-term identification information field 63 no longer apply to subject 34, because in either case the binding of public key 62 to the identification attributes is invalid.

At step 402, registration authority 38 retrieves unsigned certificate 60 from certificate database 40 and computes a cryptographic hash of unsigned certificate 60 using the agreed upon collision-resistant hash function. In one embodiment, registration authority 38 marks unsigned certificate 60 in certificate database 40 as being invalid, for auditing purposes. In an alternative embodiment, where retention of unsigned certificate 60 in certificate database 40 is not required for auditing purposes, registration authority 38 deletes unsigned certificate 60 from certificate database 40.

At step 404, registration authority 38 sends a message to credentials server 42 containing the cryptographic hash of unsigned certificate 60 computed in step 402. The message sent in step 404 also requests that credentials server 42 remove the corresponding cryptographic hash of unsigned certificate 60 from hash table 44.

At step 406, credentials server 42 removes the cryptographic hash of unsigned certificate 60 from hash table 44 which corresponds to the cryptographic hash sent in the message from registration authority 38 in step 404. After step 406 is completed, credentials server 42 no longer issues short-term disposable certificates 70 against unsigned certificate 60. Consequently, once protocol 400 has been executed, neither subject 34 nor an attacker can obtain a short-term disposable certificate by presenting unsigned certificate 60 to credentials server 42.

Figure 8:
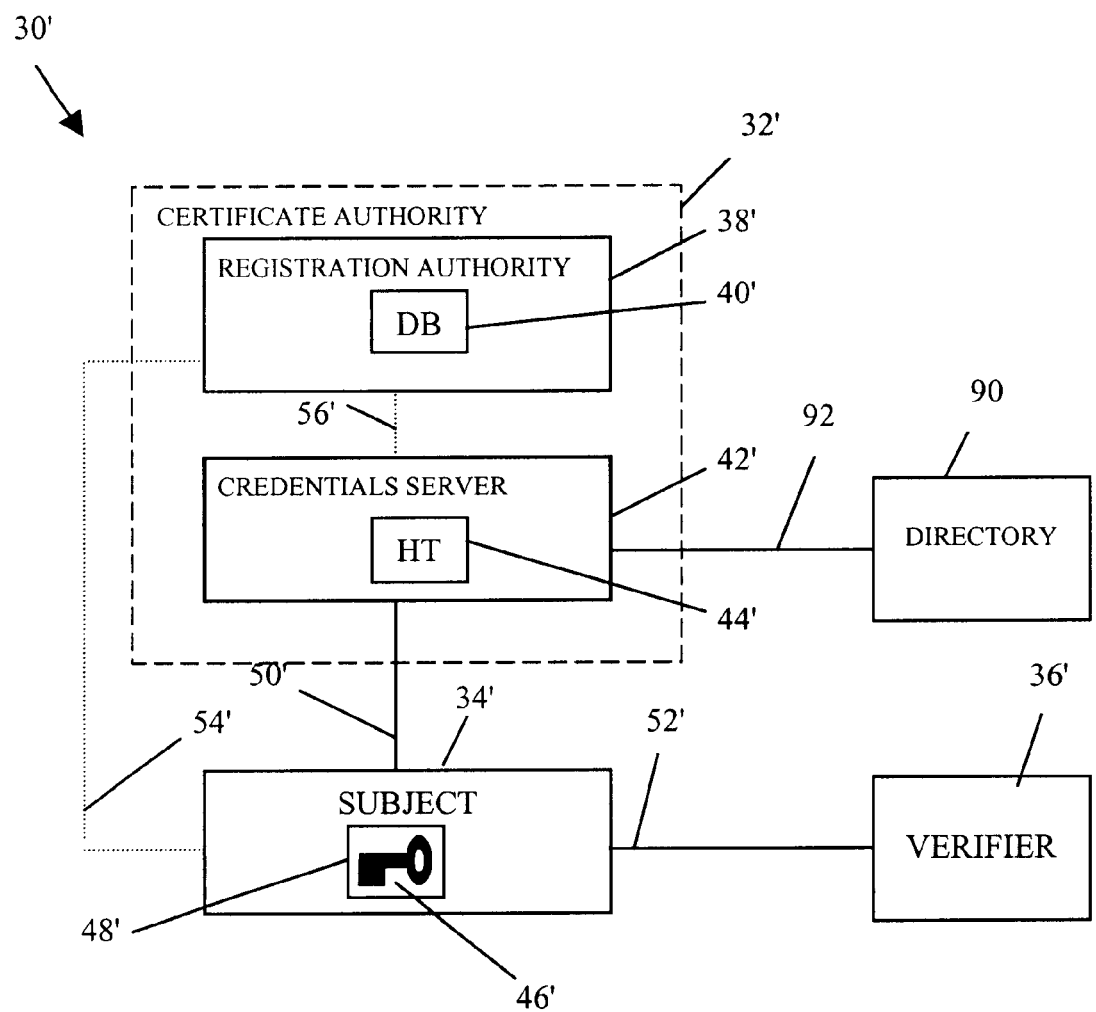
FIG. 8 is a block diagram of a light-weight PKI employing short-term disposable certificates for authorization according to the present invention.

An alternate embodiment light-weight PKI according to the present invention is illustrated generally at 30' in FIG. 8. The PKI 30' components 32', 34', 36', 38', 40', 42', 44', 46', 48', 50', 52', 54', and 56' generally operate and are generally coupled substantially the same as the corresponding PKI 30 components 32, 34, 36, 38, 40, 42, 44, 46, 48, 50, 52, 54, and 56 described above.

PKI 30', however, includes a directory 90. In one embodiment, directory 90 is a light-weight directory access protocol (LDAP) directory. PKI 30' also includes a network connection 92 to couple credentials server 42' to directory 90 to permit credentials server 42' to access directory 90. Credentials server 42' obtains short-term authorization information stored in directory 90. Credentials server 42' adds the short-term authorization information obtained from directory 90 to short-term disposable certificates issued by credentials server 42', in a similar manner as described in co-pending application entitled, "AUTHORIZATION INFRASTRUCTURE BASED ON PUBLIC KEY CRYPTOGRAPHY," which is incorporated by reference above, to create short-term credentials certificates which can be employed for authorization of subject 34'.

The short-term authorization information data contained in directory 90 relates to attribute or authorization information about subject 34'. Example short-term authorization information includes expense authorization limit for an enterprise application, co-payment amount for an insurance application, disk storage quota for an Information Technology (IT) application, and user ID plus Group ID for Unix access application.

In PKI 30', verifier 36' is an application program running on a server computer system and subject 34' is a client program that uses the application.

Unsigned certificates issued by registration authority 38' are substantially similar to the unsigned certificates issued by registration authority 38, such as unsigned certificate 60 of FIG. 2.

PKI 30' employs off-line protocol 100 illustrated in FIG. 3 for issuing unsigned certificate 60 from registration authority 38. In addition, PKI 30' employs off-line protocol 400 illustrated in FIG. 7 for registration authority 38' to revoke unsigned certificate 60.

Figure 9:
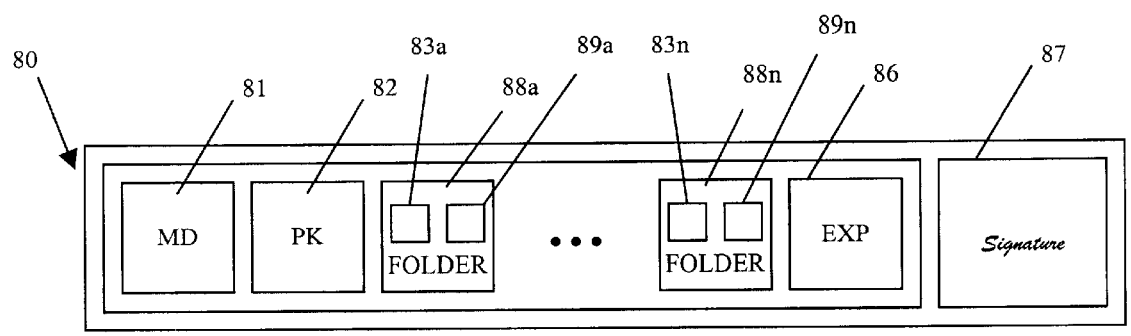
FIG. 9 is a diagram of a structured short-term disposable certificate as issued by a credentials server of the PKI of FIG. 8.

One embodiment of a structured short-term disposable certificate issued by credentials server 42' is illustrated generally at 80 in FIG. 9. Short-term disposable certificate 80 is a structured certificate, such as the structured certificates defined and described in co-pending application entitled, "METHOD AND APPARATUS FOR PROVIDING FIELD CONFIDENTIALITY IN DIGITAL CERTIFICATES," which is incorporated by reference above. Structured short-term disposable certificate 80 includes a meta-data field (MD) field 81, a public key (PK) 82, a short-term expiration field 86, and a signature field 87, which are substantially similar to meta-data field 71, public key 72, short-term expiration field 76 and signature field 77 of non-structured short-term disposable certificate 70 of FIG. 4. Structured short-term disposable certificate 80, however, includes folders 88a through 88n, which respectively correspond to applications 36'a through 36'n. For every verifier/application 36' that the subject/client 34' can access, as specified, for example, by a user profile, there is a cryptographic folder 88. Each cryptographic folder 88 contains long-term identification information 83 and/or short-term authorization information 89 as required by the corresponding verifier/application 36' to make authorization decisions about the subject/client 34'. In one embodiment, structured short-term disposable certificate 80 is implemented by adding a folder extension to an X.509v3 certificate.

Figure 10:
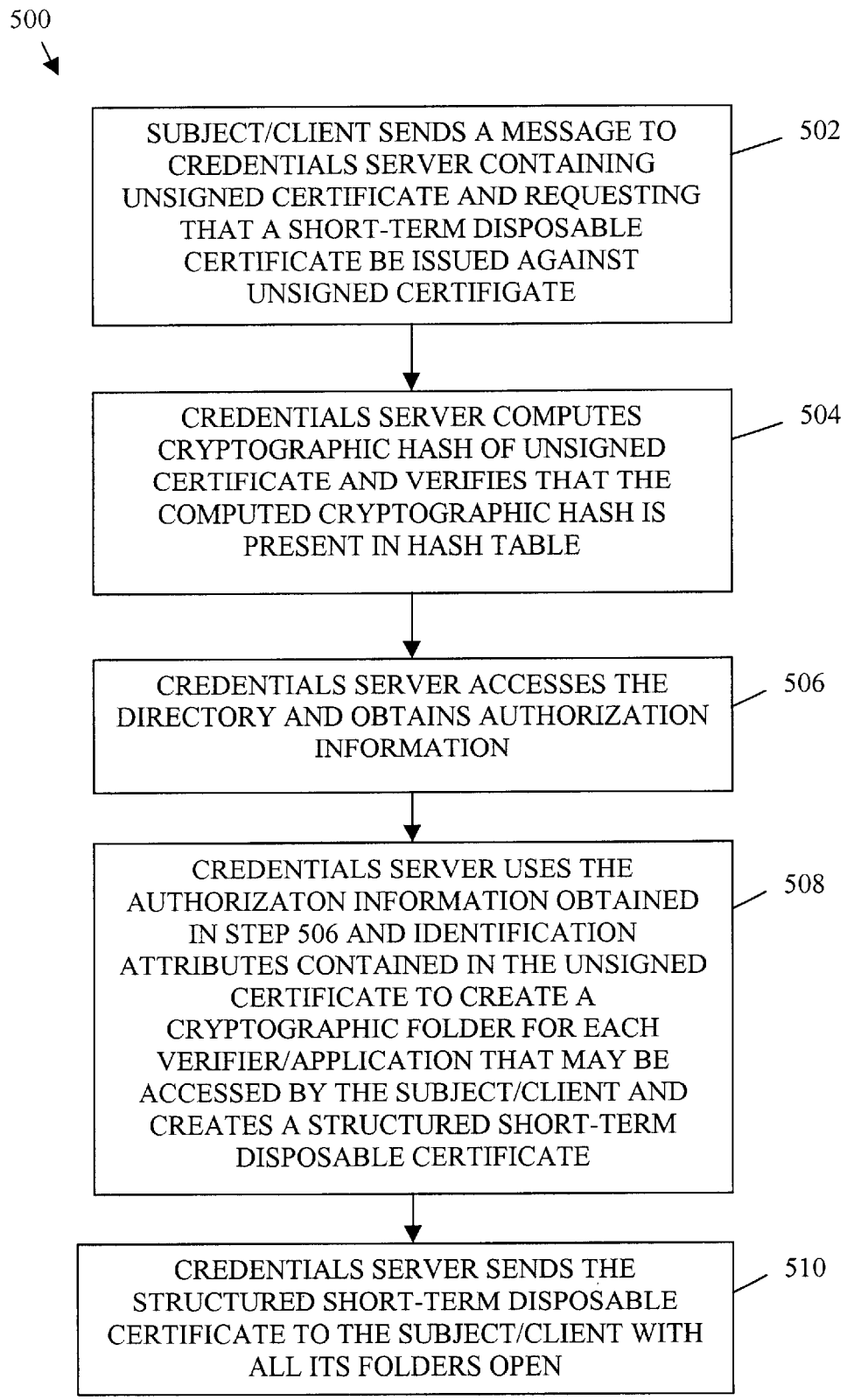
FIG. 10 is a flow diagram illustrating an on-line protocol for issuing a structured short-term disposable certificate from a credentials server of the PKI of FIG. 8.

An on-line protocol for issuing a structured short-term disposable certificate 80 to subject/client 34' from credentials server 42' against unsigned certificate 60 is generally illustrated at 500 in FIG. 10. At step 502, subject/client 34' sends a message to credentials server 42' containing unsigned certificate 60 and requesting that a short-term disposable certificate be issued against unsigned certificate 60.

At step 504, credentials server 42' computes a cryptographic hash of unsigned certificate 60 with an agreed upon collision-resistant hash function. In step 504, credentials server 42' then verifies that the computed cryptographic hash is present in hash table 44'.

At step 506, credentials server 42' accesses directory 90 via network connection 92 and obtains short-term authorization information for structured short-term disposable certificate 80.

At step 508, credentials server 42' combines the short-term authorization information obtained from directory 90 in step 506 with the identification attributes in long-term identification information field 63 of unsigned certificate 60. In step 508, credentials server 42' creates a cryptographic folder 88 for each verifier/application 36' that can be accessed by subject/client 34', where each cryptographic folder 88 contains all the long-term identification information and/or short-term authorization information required by verifier/application 36' to make authorization decisions about subject/client 34'. In step 508, credentials server 42' uses the cryptographic folders 88 to create structured short-term disposable certificate 80.

At step 510, credentials server 42' sends structured short-term disposable certificate 80 to subject/client 34', with all of the short-term disposable certificate's folders open.

Figure 11:
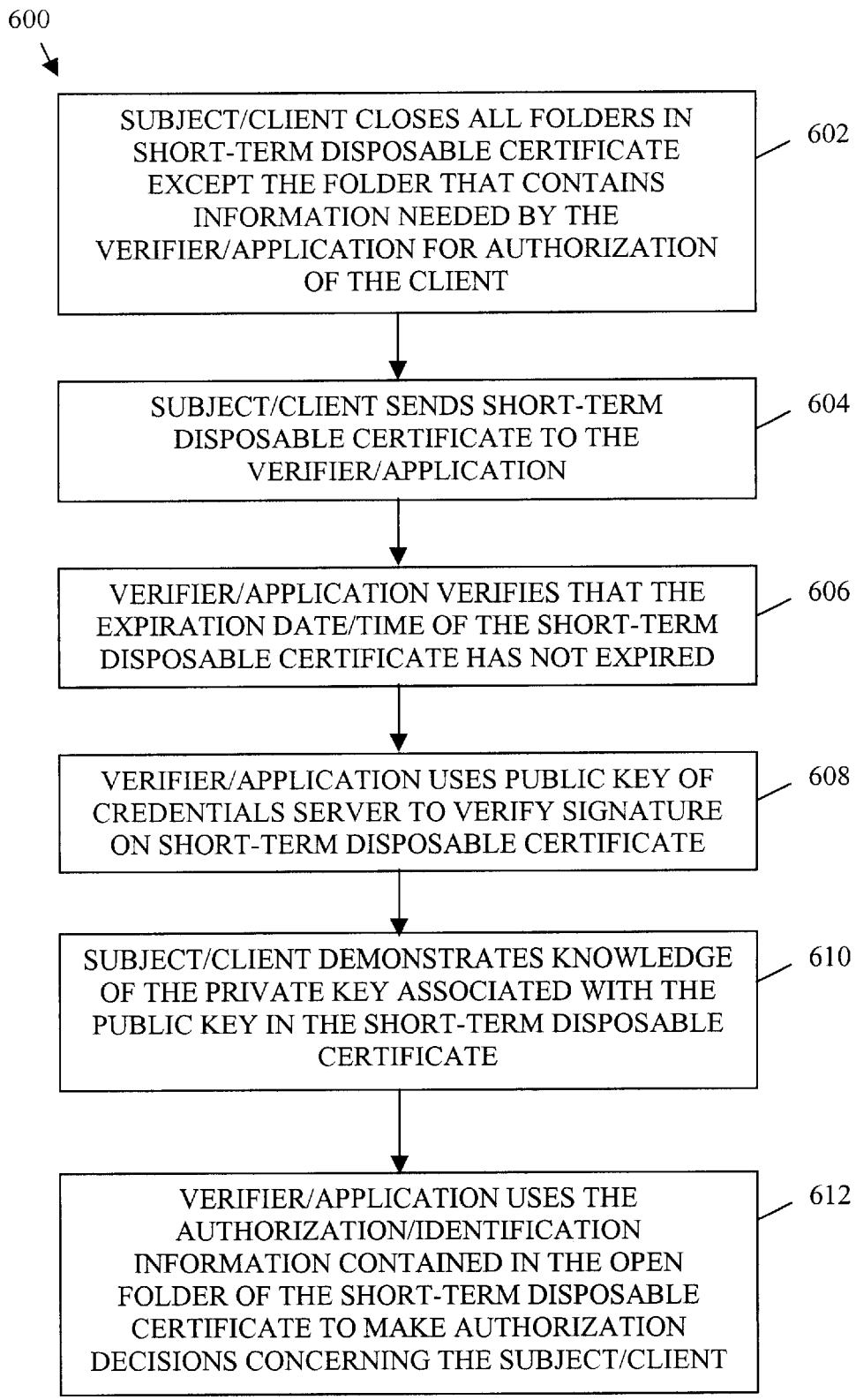
FIG. 11 is a flow diagram illustrating an on-line protocol used by a subject to demonstrate its identity to a verifier of the PKI of FIG. 8.

An on-line protocol for authorizing subject/client 34' is illustrated generally at 600 in FIG. 11. On-line protocol 600 is employed by subject/client 34' to demonstrate its identity to verifier/application 36'. On-line protocol 600 is also used by verifier/application 36' to make authorization decisions concerning subject/client 34', such as allowing/denying access or authorizing specific transactions.

At step 602, subject/client 34' closes all folders 88 in structured short-term disposable certificate 80, except the folder that contains the necessary identification/authorization information 83/89 required by verifier/application 36' to make authorization decisions concerning subject/client 34'. At step 604, subject/client 34' sends structured short-term disposable certificate 80 to verifier/application 36'.

At step 606, verifier/application 36' verifies that the expiration date/time specified in expiration field 86 of structured short-term disposable certificate 80 has not expired.

At step 608, verifier/application 36' uses a public key of credentials server 42' to verify the signature in signature field 87 of structured short-term disposable certificate 80. Verifier/application 36' knows the public key of credentials server 42' either directly or through certification by a higher certificate authority.

At step 610, subject/client 34' demonstrates knowledge of the private key 46' associated with the public key 82 of structured short-term disposable certificate 80. Step 610 is performed in a way that depends on the cryptosystem for which the private/public key pair has been generated by subject/client 34'. For example, in a digital signature cryptosystem, subject/client 34' demonstrates knowledge of the private key 46' by using private key 46' to digitally sign a quantity derived from a random quantity generated by verifier/application 36'. Verifier/application 36' then verifies this digital signature using the public key 82 of structured short-term disposable certificate 80'.

At step 612, verifier/application 36' extracts the identification/authorization information 83/89 contained in the open folder 88 of structured short-term disposable certificate 80. In step 612, verifier/application 36' then uses the identification/authorization information 83/89 to make authorization decisions concerning subject/client 34'.

On-line protocol 600 for authorizing subject/client 34' utilizes structured short-term disposable certificate 80 having one folder for each application that may be accessed by subject/client 34' as determined by a user profile. This ensures that each application only has access to authorization information that it requires. Nevertheless, the authorization performed by PKI 30' can be implemented with non-structured short-term disposable certificates, where multiple non-structured short-term disposable certificates are employed in place of one structured short-term disposable certificate 80.

The PKI 30/30' according to the present invention is greatly simplified and substantially more efficient than conventional PKIs. For example, applications only need to use the short-term disposable certificate for authentication and/or authorization. The unsigned certificate 60, which replaces the traditional long-term certificate, can be reserved for use by the subject when requesting a short-term disposable certificate. Since the unsigned certificate 60 is not used by applications, it does not need to be signed. Instead of signing the unsigned certificate 60, the credentials server keeps the cryptographic hash table 44, which contains the cryptographic hashes of the unsigned certificates that are currently valid. In this way, certificate revocation is performed simply by removing the cryptographic hash of the unsigned certificate from hash table 44. Therefore, unlike conventional PKIs, there is no signature required, no expiration date required, and no need for CRLs for unsigned certificate 60 of the PKI 30/30' according to the present invention.

PKI 30/30' requires a certificate status check somewhat like the on-line certificate status check required by OCSP. The certificate status check of PKI 30/30' according to the present invention, however, occurs when the subject requests the short-term disposable certificate, rather than when the subject accesses the application, such as required by OCSP.

Figure 12:
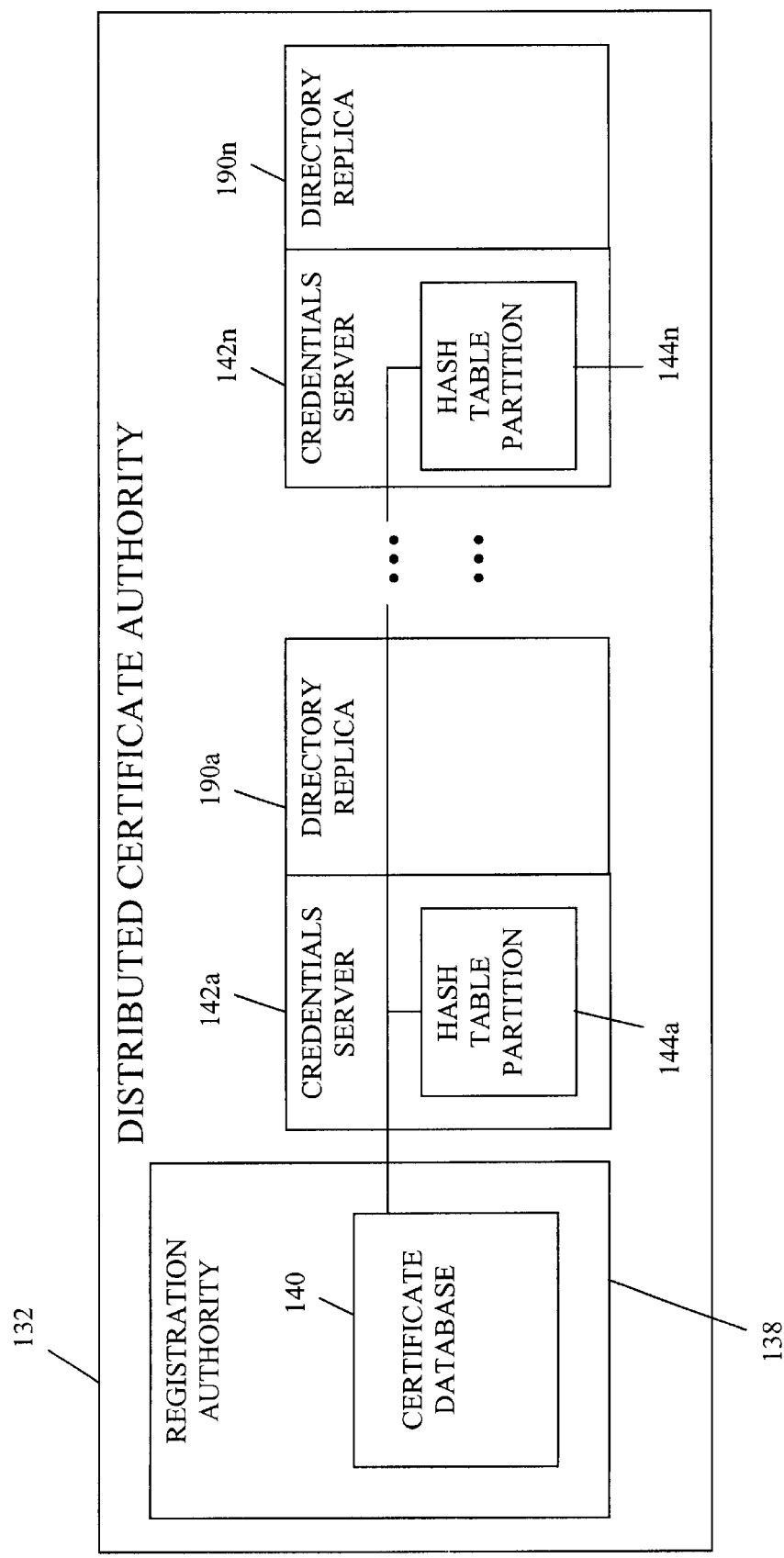
FIG. 12 is a block diagram of a distributed certificate authority having distributed credentials servers according to the present invention.

A distributed certificate authority 132 for use in PKI 30/30' according to the present invention is illustrated in FIG. 12. Distributed certificate authority 132 includes a registration authority 138 having a certificate database 140 which communicates with a distributed credentials server 142.

Distributed credentials server 142 includes credentials servers 142a through 142n. Each credentials server 142 includes a corresponding hash table partition 144. In one embodiment, cryptographic hash table 144 is partitioned into hash table partitions 144a through 144n according to a value of some of the bits of the cryptographic hash. In a PKI 30/30' employing distributed certificate authority 132 having distributed credentials servers 142a–142n, the subject sends request for a short-term disposable certificate directly to the correct hash table partition 144.

Certificate authority 132 is further optimized by directly coupling each credentials server 142 with its own replica of directory 190.

The PKI 30/30' according to the present invention is highly scalable because many bottlenecks of conventional PKIs are removed. The unsigned certificates 60 employed by PKI 30/30' do not expire and do not have to be renewed periodically. In addition, CRLs are not used. No significant bottlenecks have been introduced with PKI 30/30'.

One potential bottleneck of PKI 30/30' is that the credentials server 42/42'/142 issues short-term disposable certificates very often, such as once a day, every few hours, or even every few minutes. This frequency of issuing short-term disposable certificates from the credentials server according to the present invention, however, is not a significant bottleneck, because the hash table can be partitioned, such as hash table portions 144a–144n of the distributed certificate authority 132 illustrated in FIG. 12 and the credentials server can be replicated as required, such as credentials servers 142a–142n of distributed certificate authority 132.

Another potential bottleneck with PKI 30/30' is the certificate database 40/40' of registration authority 38/38'. However, certificate database 40/40' is not a significant bottleneck, because the certificate database is only accessed when unsigned certificates 60 are issued or revoked. Certificate database 40/40' can be implemented using a relational database management system (DBMS), which can handle millions of unsigned certificates.

Another potential bottleneck with PKI 30/30' is directory 90. Directory 90 is not a significant bottleneck, because directory 90 can be replicated to make it possible to handle millions of users. In addition, LDAP traffic to directory 90 is significantly reduced, since applications do not access directory 90 to make authorizations decisions, since all necessary authorization information is contained in short-term disposable certificate 80 in the embodiment where PKI 30' is used for authorizing the subject. Therefore, PKI according to the present invention can scale to millions of users.

EXAMPLE APPLICATION OF PKI ACCORDING TO THE PRESENT INVENTION

The PKI according to the present invention can be used advantageously in a broad range of applications. The following two examples provide only two of numerous applications for the PKI according to the present invention.

Web Server Certificates

Figure 13:
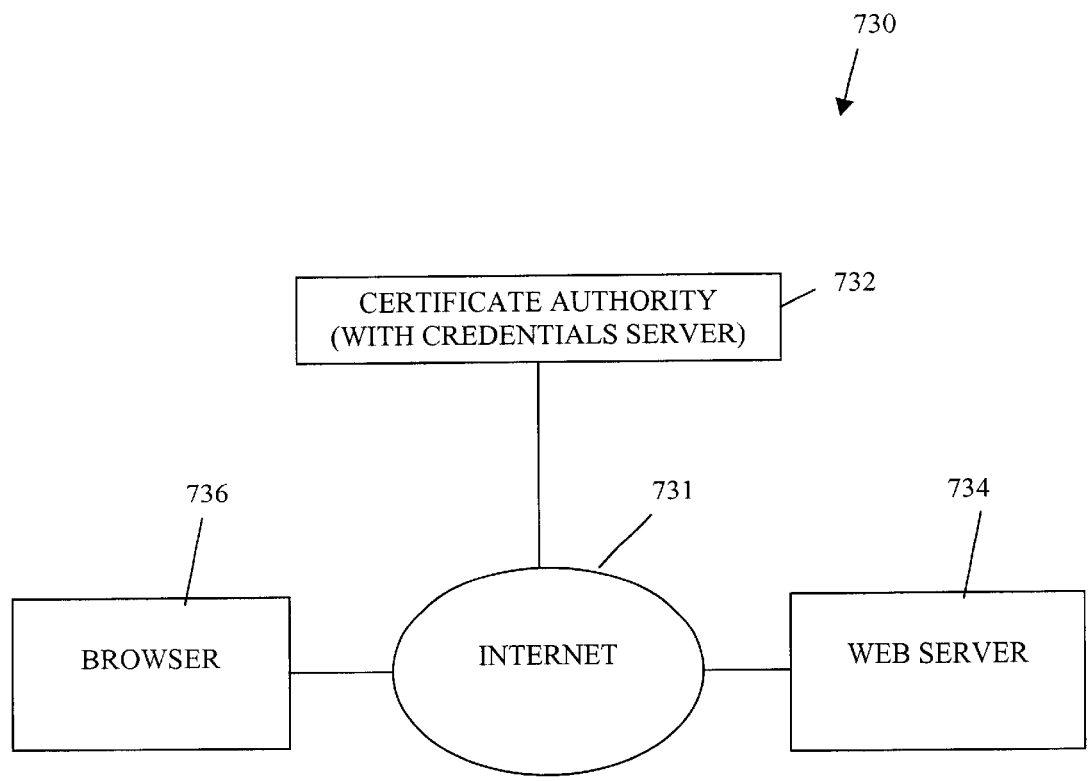
FIG. 13 is a PKI for web server certificate applications according to the present invention.

A PKI according to the present invention for a web server certificate application is illustrated generally at 730 in FIG. 13. PKI 730 includes a certificate authority 732 (with credentials server), a web server/subject 734, and a browser/verifier 736, which are all coupled through an Internet 731.

PKI 730 does not use short-term authorization information in its short-term disposable certificate. Therefore, a suitable short-term disposable certificate for PKI 30 is short-term disposable certificate 70 illustrated in FIG. 4, which is a non-structured certificate (i.e., no folders). In addition, the short-term disposable certificate 70 employed in PKI 730 contains no confidential information.

Figure 14:
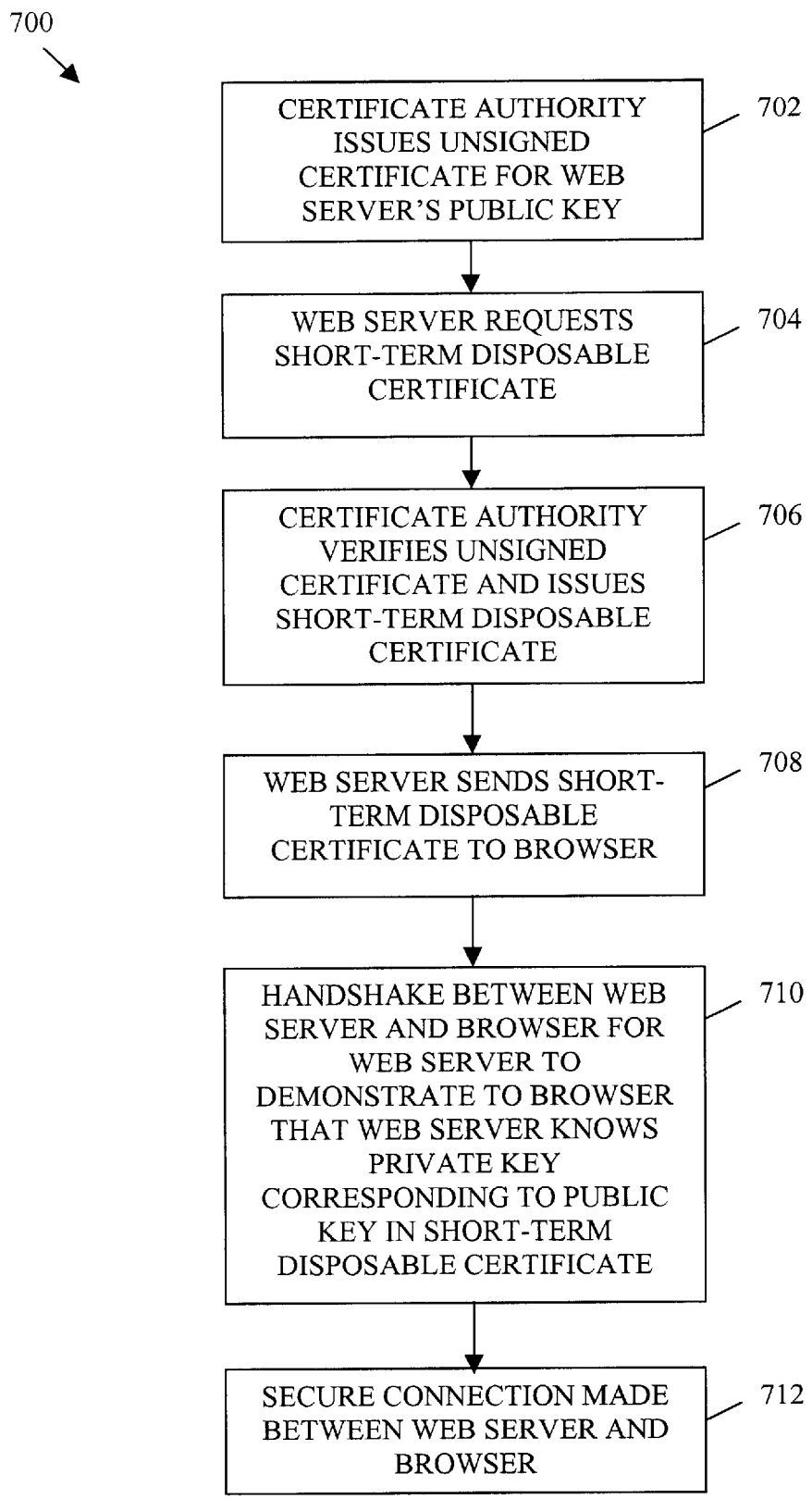
FIG. 14 is a flow diagram illustrating a protocol for web server certificate applications for the PKI of FIG. 13.

A web server certificate protocol for PKI 730 is illustrated generally at 700 in FIG. 14. At step 702, certificate authority 732 issues an unsigned certificate 60 for web server 734's public key. The unsigned certificate is not signed, is retrieved only once, and never expires.

At step 704, web server 734 requests a non-structured short-term disposable certificate 70. The unsigned certificate 60 is sent as part of the web server request. In one embodiment, meta-data field 61 specifies the duration of the validity period of the to be issued short-term disposable certificate 70.

At step 706, certificate authority 732 verifies the unsigned certificate 60 provided by web server 734 and issues a corresponding short-term disposable certificate 70. In step 706, short-term disposable certificate 70 is derived from the unsigned certificate 60 by adding an expiration time in short-term expiration field 76, such as 24 hours after the present time, and by adding the certificate authority 732's signature in signature field 77.

At step 708, web server 734 sends short-term disposable certificate 70 to browser 736. Step 708 is part of a protocol for establishing an SSL connection. At step 710, a handshake is performed between browser 736 and web server 734. In step 710, web server 734 demonstrates to browser 736 that web server 734 knows the private key corresponding to the public key in short-term disposable certificate 70. Step 710 is also part of the protocol for establishing the SSL connection.

At step 712 a secure connection is made between browser 736 and web server 734. In step 712, an example secure connection is SSL which provides data integrity, which prevents connection high-jacking and other man-in-the-middle attacks. SSL also provides encryption to ensure confidentiality.

In conventional web server certificate PKI applications, the web server's certificate can not be revoked or the browser must access the certificate authority to obtain the latest CRL or check the certificate status via OCSP. Having the browser of a conventional web server certificate PKI access the certificate authority is highly undesirable, because this access to the certificate authority introduces a delay which is perceived by the user as additional delay in accessing the web server. In addition, this browser access of the certificate authority possibly prevents access to the web server if the certificate authority is down. Moreover, CRL or OCSP processing requires additional code in the browser, which may not fit in the browser if the browser runs on a small network appliance.

By contrast to the conventional PKI, in PKI 730 according to the present invention, certificate authority 732 can revoke the web server's unsigned certificate 60. After certificate authority 732 has revoked unsigned certificate 60, web server 734 is no longer able to obtain short-term disposable certificates, and browsers 736 are not able to establish SSL connections to web server 734. Moreover, browser 736 does not use CRLs or OCSP, so browser access of certificate authority 732 to obtain the latest CRL or check the certificate status via OCSP is not required with PKI 730.

Enterprise PKI

Figure 15:
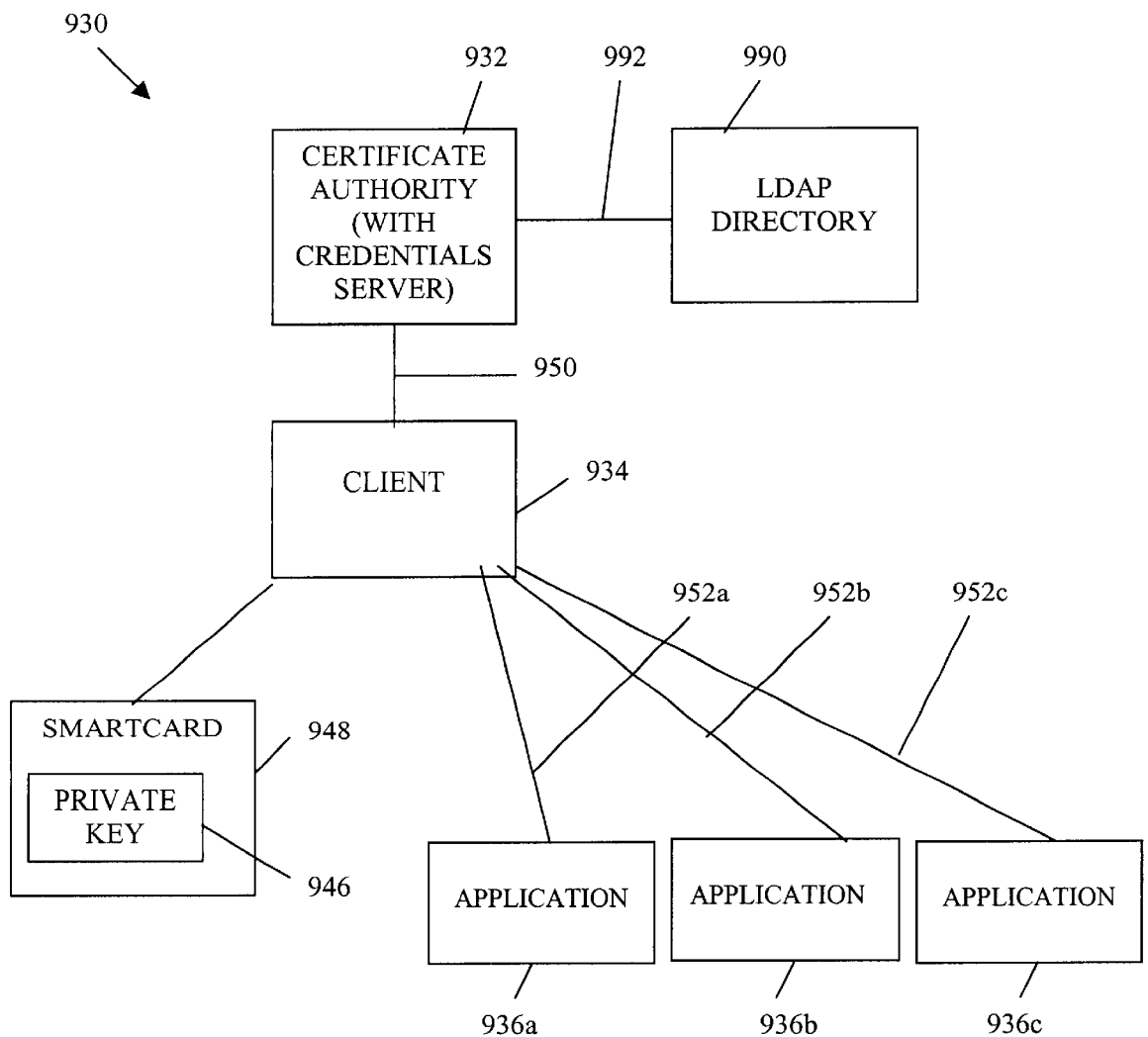
FIG. 15 is a block diagram of an enterprise PKI according to the present invention.

An enterprise PKI according to the present invention is illustrated generally at 930 in FIG. 15. Enterprise PKI 930 includes a certificate authority 932 (with credentials server) coupled to a client 934 via a network connection 950. Certificate authority 932 is coupled to a LDAP directory 990 via a network connection 992. Client 934 has access to a user's private key 946 stored in a smartcard 948. Client 934 is coupled to applications 936a, 936b, and 936c via network connections 952a, 952b, and 952c respectively.

The network connections of enterprise PKI 930 are deemed secure or are protected by host-to-host IPSEC. Client 934's short-term disposable certificate is a structured certificate, such as structured short-term disposable certificate 80 illustrated in FIG. 9. Structured short-term disposable certificate 80 in enterprise PKI 930 contains short-term authorization information that is possibly confidential.

Figure 16:
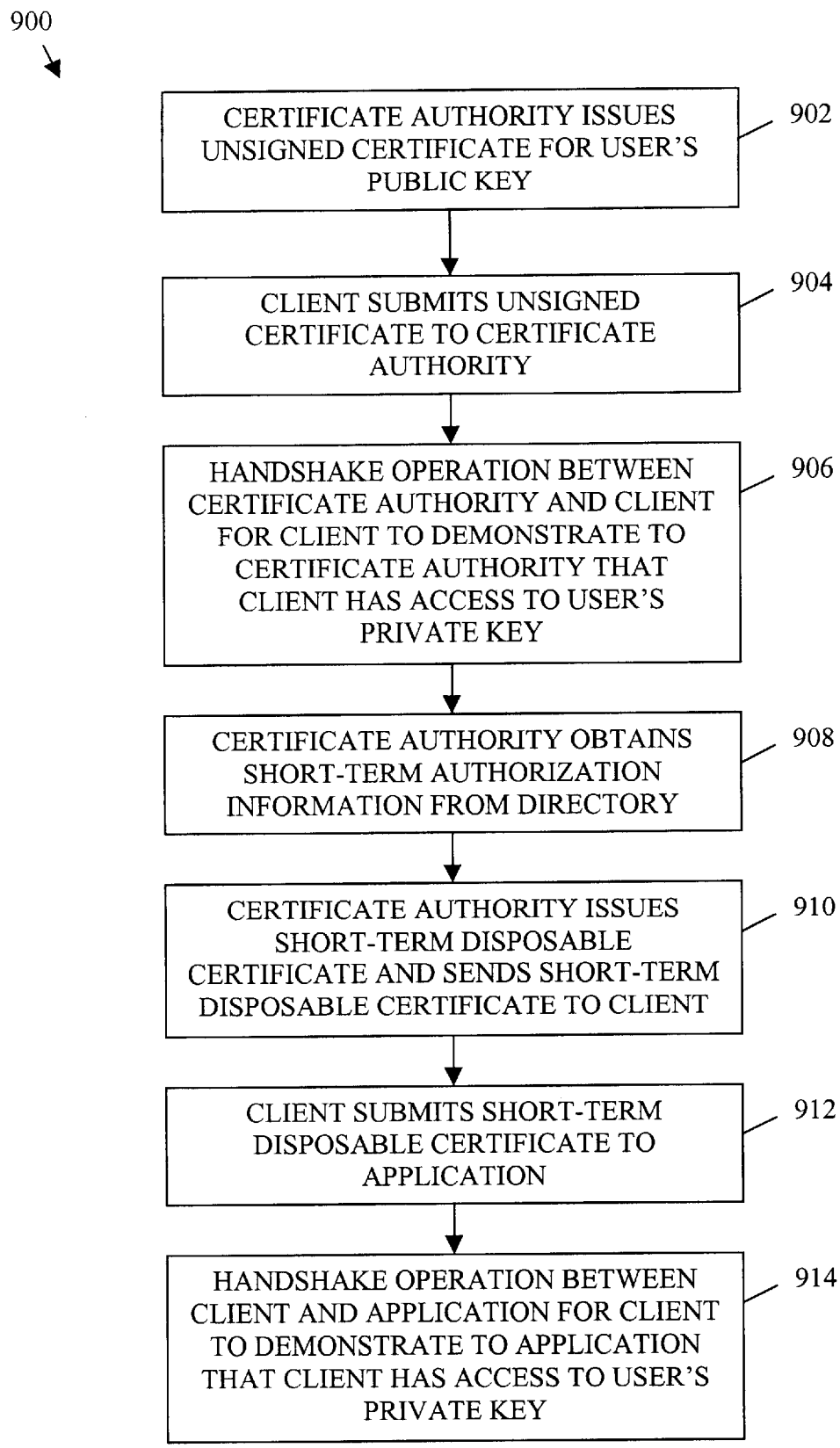
FIG. 16 is a flow diagram illustrating an authorization protocol for the enterprise PKI of FIG. 17.

An authorization protocol for enterprise PKI 930 is illustrated generally at 900 in FIG. 16. At step 902, certificate authority 932 issues an unsigned certificate 60 for the user's public key. Step 902 needs only be taken once. At step 904, client 934 submits unsigned certificate 60 to certificate authority 932. Step 904 is taken at network logon.

At step 906, a handshake between certificate authority 932 and client 934 permits client 934 to demonstrate to certificate authority 932 that client 934 has access to the user's private key 946 stored in smartcard 948. Step 906 is taken at network logon. At step 908, certificate authority 932 obtains short-term authorization information from LDAP directory 990. In one embodiment, LDAP directory 990 is integrated with certificate authority 932. Step 908 is taken at network logon.

At step 910, certificate authority 932 issues structured short-term disposable certificate 80. In step 910, certificate authority 932 sends the issued structured short-term disposable certificate 80 to client 934. In an example application of enterprise PKI 930, the structured short-term disposable certificate 80 includes three folders, one for each application 936a, 936b, and 936c. All of the folders of structured short-term disposable certificate 80 are open. Some of the information in the folders of structured short-term disposable certificate 80 is possibly confidential. Network connections 952, however, are deemed secure or are protected by host-to-host IPSEC. Step 910 is taken at network logon.

At step 912, client 934 submits structured short-term disposable certificate 80 to the requested application 936. For example, if the requested application is 936b, the folder 88b, corresponding to application 936b, remains open. In this example, the folders 88a and 88c of structured short-term disposable certificate 80, which correspond to applications 936a and 936c, are closed.

At step 914, a handshake is performed between the requested application 936b and client 934. In step 914, client 934 demonstrates to application 936b that client 934 has access to the user's private key 946 stored in smartcard 948.

The enterprise PKI 930 according to the present invention is streamlined compared to conventional enterprise PKIs. Enterprise PKI 930 does not need to use CRLs or OCSP. All information needed to make authorizations decisions is contained in structured short-term disposable certificate 80. Therefore, applications 936 do not need to access LDAP directory 990 to make authorizations decisions about client 934.

Enterprise PKI 930 can handle millions of users. PKI 930 is suitable to provide authentication and authorization services for all employees and business partners of a corporation of any size.

Figure 17:
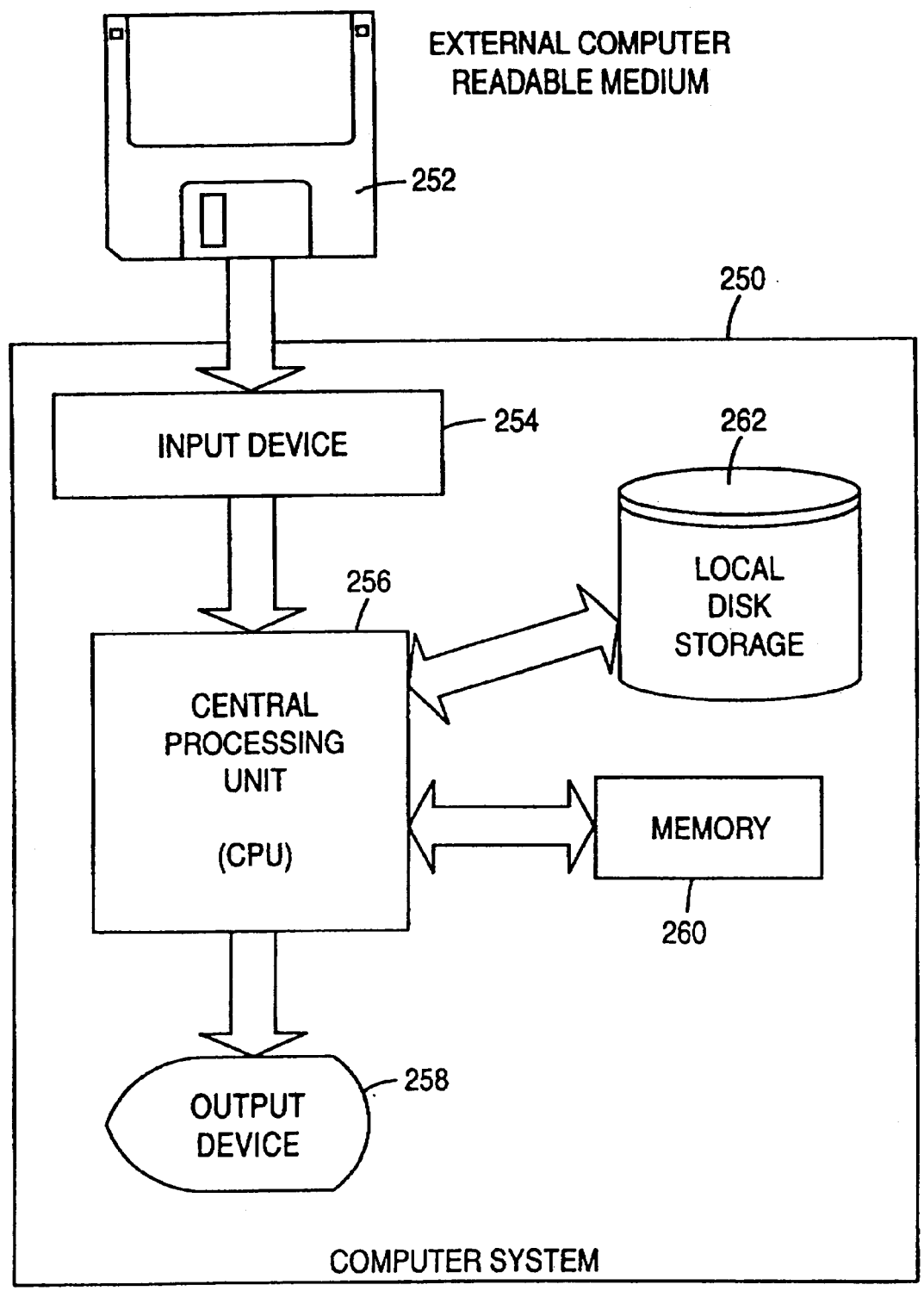
FIG. 17 is a block diagram of a computer system and a corresponding computer readable medium incorporating one or more main software program components of a PKI according to the present invention.

FIG. 17 illustrates one embodiment of a computer system 250 and an external computer readable medium 252 which can be employed according to the present invention to implement one or more of the main software program components of a light-weight PKI according to the present invention, such as PKI 30, PKI 30', PKI 730, PKI 830 and PKI 930. Embodiments of external computer readable medium 252 include, but are not limited to: a CD-ROM, a floppy disk, and a disk cartridge. Any one of the main software program components of a light-weight PKI according to the present invention can be implemented in a variety of compiled and interpreted computer languages. External computer readable medium 252 stores source code, object code, executable code, shell scripts and/or dynamic link libraries for any one of the main software program components of a light-weight PKI according to the present invention. An input device 254 reads external computer readable medium 252 and provides this data to computer system 250. Embodiments of input device 254 include but are not limited to: a CD-ROM reader, a floppy disk drive, and a data cartridge reader.

Computer system 250 includes a central processing unit 256 for executing any one of the main software program components of a light-weight PKI according to the present invention. Computer system 250 also includes local disk storage 262 for locally storing any one of the main software program components of a light-weight PKI according to the present invention before, during, and after execution. Any one of the main software program components of a light-weight PKI according to the present invention also utilizes memory 260 within the computer system during execution. Upon execution of any one of the main software program components of a light-weight PKI according to the present invention, output data is produced and directed to an output device 258. Embodiments of output device 258 include, but are not limited to: a computer display device, a printer, and/or a disk storage device.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A public key infrastructure (PKI) comprising:
   a subject;
   an off-line registration authority for issuing a first unsigned certificate off-line to the subject that binds a public key of the subject to long-term identification information related to the subject, the registration authority maintaining a certificate database of unsigned certificates in which it stores the first unsigned certificate;
   an on-line credentials server for issuing a short-term disposable certificate on-line to the subject, the short-term disposable certificate binds the public key of the subject from the first unsigned certificate to the long-term identification information related to the subject from the first unsigned certificate, wherein the credentials server maintains a table that contains entries corresponding to valid unsigned certificates stored in the certificate database; and
   a verifier, wherein the subject presents the short-term disposable certificate to the verifier for authentication and demonstrates that the subject has knowledge of a private key corresponding to the public key in the short-term disposable certificate.

2. The PKI of claim 1 wherein the short-term disposable certificate includes an expiration date/time.

3. The PKI of claim 2 wherein a validity period from when the credentials server issues the short-term disposable certificate to the expiration date/time is sufficiently short such that the short-term certificate does not need to be subject to revocation.

4. The PKI of claim 2 wherein the short-term disposable certificate is not subject to revocation.

5. The PKI of claim 1 wherein the table maintained by the credentials server is a hash table containing cryptographic hashes of valid unsigned certificates stored in the certificate database and including a cryptographic hash of the first unsigned certificate, wherein the subject presents the issued first unsigned certificate to the credentials server to obtain the short-term disposable certificate.

6. The PKI of claim 5 wherein the credentials server computes the cryptographic hash of the first unsigned certificate with a collision-resistant hash function.

7. The PKI of claim 6 wherein the collision-resistant hash function is a SHA-1 hash function.

8. The PKI of claim 6 wherein the collision-resistant hash function is a MD5 hash function.

9. The PKI of claim 1 wherein the registration authority and the credentials server are included in a certificate authority.

10. The PKI of claim 9 wherein the certificate authority is a distributed certificate authority including at least two distributed credentials servers.

11. The PKI of claim 10 wherein the at least two distributed credentials servers includes at least two corresponding hash table partitions containing cryptographic hashes of valid unsigned certificates corresponding to the unsigned certificates stored in the certificate database, wherein one of the hash table partitions contains a cryptographic hash of the first unsigned certificate, wherein the subject presents the issued first unsigned certificate to one of the at least two distributed credentials servers to obtain the short-term disposable certificate.

12. The PKI of claim 9 wherein the certificate authority revokes the first unsigned certificate when the binding of the subject's public key to the long-term identification information related to the subject becomes invalid.

13. The PKI of claim 12 wherein the certificate authority performs a revocation protocol to revoke the first unsigned certificate, the revocation protocol including:
the registration authority retrieving the first unsigned certificate from the certificate database and computing a cryptographic hash of the first unsigned certificate;
sending a message from the registration authority to credentials server containing the cryptographic hash of the first unsigned certificate and requesting that the credentials server remove the corresponding cryptographic hash of the first unsigned certificate from its hash table; and
the credentials server removing the cryptographic hash of the first unsigned certificate from its hash table.

14. The PKI of claim 13 wherein the revocation protocol includes the registration authority marking the first unsigned certificate in the certificate database as being invalid, for auditing purposes.

15. The PKI of claim 13 wherein the revocation protocol includes the registration authority deleting the first unsigned certificate from the certificate database.

16. The PKI of claim 1 wherein the short-term disposable certificate is a non-structured short-term certificate.

17. The PKI of claim 1 further comprising:
a directory for storing short-term authorization information related to the subject;
wherein the short-term disposable certificate also binds the public key of the subject from the first unsigned certificate to the short term authorization information related to the subject from the directory; and
wherein the subject presents the short-term disposable certificate to the verifier for authorization and demonstrates that the subject has knowledge of a private key corresponding to the public key in the short-term disposable certificate.

18. The PKI of claim 1 further comprising:
a second verifier; and
wherein the short-term certificate is a structured short-term certificate including:
a first folder corresponding to the first named verifier and containing long-term information and short-term information as required by the first named verifier;
a second folder corresponding to the second verifier and containing long-term information and short-term information as required by the second verifier;
wherein the first folder is open and the second folder is closed when the subject presents the short-term disposable certificate to the first named verifier for authorization, wherein closing the second folder makes its contents not readable by the first named verifier; and
wherein the first folder is closed and the second folder is open when the subject presents the short-term disposable certificate to the second verifier for authorization, wherein closing the first folder makes its contents not readable by the second verifier.

19. The PKI of claim 18 wherein the first folder and the second folder are implemented as extension fields of an X.509v3 certificate.

20. The PKI of claim 1 wherein the short-term certificate is an X.509v3 certificate.

21. The PKI of claim 1 wherein the private key is stored in a smartcard accessible by the subject.

22. The PKI of claim 1 wherein the private key is stored in a secure software wallet accessible by the subject.

23. A method of authenticating a subject, the method comprising:
issuing a first unsigned certificate off-line to the subject that binds a public key of the subject to long-term identification information related to the subject;
maintaining a certificate database of unsigned certificates off-line including storing the first unsigned certificate in the certificate database;
issuing a short-term disposable certificate on-line to the subject, the short-term disposable certificate binds the public key of the subject from the first unsigned certificate to the long-term identification information related to the subject from the first unsigned certificate;
maintaining a table on-line that contains entries corresponding to valid unsigned certificates stored in the certificate database; and
presenting the short-term disposable certificate by the subject to a verifier for authentication and demonstrating that the subject has knowledge of a private key corresponding to the public key in the short-term disposable certificate.

24. The method of claim 23 wherein the short-term disposable certificate includes an expiration date/time.

25. The method of claim 24 wherein a validity period from when the short-term disposable certificate is issued to the expiration date/time is sufficiently short such that the short-term certificate does not need to be subject to revocation.

26. The method of claim 24 wherein the short-term disposable certificate is not subject to revocation.

27. The method of claim 23 wherein the table is maintained by a credentials server and is a hash table containing cryptographic hashes of valid unsigned certificates stored in the certificate database and including a cryptographic hash of the first unsigned certificate, wherein the method further includes:
presenting the issued first unsigned certificate by the subject to the credentials server to obtain the short-term disposable certificate.

28. The method of claim 27 further comprising:
computing the cryptographic hash of the first unsigned certificate with a collision-resistant hash function.

29. The method of claim 28 wherein the collision-resistant hash function is a SHA-1 hash function.

30. The method of claim 28 wherein the collision-resistant hash function is a MD5 hash function.

31. The method of claim 23 wherein the short-term disposable certificate is a non-structured short-term certificate.

32. The method of claim 23 further comprising:
storing short-term authorization information related to the subject in a directory, wherein the short-term disposable certificate also binds the public key of the subject from the first unsigned certificate to the short term authorization information related to the subject from the directory; and
presenting the short-term disposable certificate by the subject to the verifier for authorization and demonstrating that the subject has knowledge of a private key corresponding to the public key in the short-term disposable certificate.

33. The method of claim 23 wherein the short-term certificate is a structured short-term certificate including a first folder corresponding to the first named verifier and containing long-term information and short-term information as required by the first named verifier, and including a second folder corresponding to a second verifier and containing long-term information and short-term information as required by the second verifier, the method further comprising:
- closing the second folder and leaving the first folder open prior to the presenting step if the short-term disposable certificate is presented by the subject to the first named verifier for authorization, wherein closing the second folder makes its contents not readable by the first named verifier; and
- closing the first folder and leaving the second folder open prior to the presenting step if the short-term disposable certificate is presented by the subject to the second verifier for authorization, wherein closing the first folder makes its contents not readable by the second verifier.

34. The method of claim 33 further comprising:
implementing the first folder and the second folder as extension fields of an X.509v3 certificate.

35. The method of claim 23 wherein the short-term certificate is an X.509v3 certificate.

36. The method of claim 23 further comprising:
storing the private key in a smartcard accessible by the subject.

37. The method of claim 23 further comprising:
storing the private key in a secure software wallet accessible by the subject.

38. The method of claim 23 further comprising:
revoking the first unsigned certificate when the binding of the subject's public key to the long-term identification information related to the subject becomes invalid.

39. The method of claim 38 further comprising:
performing a revocation protocol to revoke the first unsigned certificate, the revocation protocol including:
- retrieving the first unsigned certificate from the certificate database and computing a cryptographic hash of the first unsigned certificate;
- sending a message containing the cryptographic hash of the first unsigned certificate request that the corresponding cryptographic hash of the first unsigned certificate be removed from its hash table; and
- removing the cryptographic hash of the first unsigned certificate from its hash table.

40. The method of claim 39 wherein the revocation protocol includes:
marking the first unsigned certificate in the certificate database as being invalid, for auditing purposes.

41. The method of claim 39 wherein the revocation protocol includes:
deleting the first unsigned certificate from the certificate database.

42. A system for issuing digital certificates, the system comprising:
- an off-line registration authority for issuing a first unsigned certificate off-line to a subject that binds a public key of the subject to long-term identification information related to the subject; and
- an on-line credentials server for issuing a short-term disposable certificate on-line to the subject, the short-term disposable certificate binds the public key of the subject from the first unsigned certificate to the long-term identification information related to the subject from the first unsigned certificate, wherein the credentials server maintains a table that contains entries corresponding to valid issued unsigned certificates;
- wherein a presentation of the short-term disposable certificate and a demonstration of the subject's knowledge of a private key corresponding to the public key bound by the short-term disposable certificate provides authentication of the subject to a verifier.

43. The system of claim 42, wherein the table maintained by the credentials server is a hash table containing cryptographic hashes of valid issued unsigned certificates and including a cryptographic hash of the first unsigned certificate, wherein the subject presents the issued first unsigned certificate to the credentials server to obtain the short-term disposable certificate.

44. The system of claim 42, wherein the registration authority and the credentials server are included in a distributed certificate authority including at least two distributed credentials servers.

45. The system of claim 44, wherein the at least two distributed credentials servers includes at least two corresponding hash table partitions containing cryptographic hashes of valid unsigned certificates corresponding to issued unsigned certificates, wherein one of the hash table partitions contains a cryptographic hash of the first unsigned certificate, wherein the subject presents the issued first unsigned certificate to one of the at least two distributed credentials servers to obtain the short-term disposable certificate.

46. The system of claim 42, further comprising:
- a directory for storing short-term authorization information related to the subject;
- wherein the short-term disposable certificate also binds the public key of the subject from the first unsigned certificate to the short term authorization information related to the subject from the directory; and
- wherein the subject presents the short-term-disposable certificate to the verifier for authorization and demonstrates that the subject has knowledge of a private key corresponding to the public key in the short-term disposable certificate.

47. The system of claim 42, further comprising:
- a second verifier; and
- wherein the short-term certificate is a structured short-term certificate including:
  - a first folder corresponding to the first named verifier and containing long-term information and short-term information as required by the first named verifier;
  - a second folder corresponding to the second verifier and containing long-term information and short-term information as required by the second verifier; and
  - wherein the first folder is open and the second folder is closed when the subject presents the short-term disposable certificate to the first named verifier for authorization, wherein closing the second folder makes its contents not readable by the first named verifier.

48. A method of authenticating a subject, the method comprising:
- issuing a first unsigned certificate off-line to the subject that binds a public key of the subject to long-term identification information related to the subject;
- issuing a short-term disposable certificate on-line to the subject, the short-term disposable certificate binds the public key of the subject from the first unsigned certificate to the long-term identification information related to the subject from the first unsigned certificate;

maintaining a table on-line that contains entries corresponding to valid issued unsigned certificates; and presenting the short-term disposable certificate by the subject to a verifier for authentication and demonstrating that the subject has knowledge of a private key corresponding to the public key in the short-term disposable certificate.

49. The method of claim 48 wherein the maintained table is a hash table containing cryptographic hashes of valid issued unsigned certificates and including a cryptographic hash of the first unsigned certificate, wherein the method further includes:

presenting the issued first unsigned certificate by the subject to the credentials server to obtain the short-term disposable certificate.

50. The method of claim 48 further comprising:

storing short-term authorization information related to the subject in a directory, wherein the short-term disposable certificate also binds the public key of the subject from the first unsigned certificate to the short term authorization information related to the subject from the directory; and presenting the short-term disposable certificate by the subject to the verifier for authorization and demonstrating that the subject has knowledge of a private key corresponding to the public key in the short-term disposable certificate.

51. The method of claim 48 wherein the short-term certificate is a structured short-term certificate including a first folder corresponding to the first named verifier and containing long-term information and short-term information as required by the first named verifier, and including a second folder corresponding to a second verifier and containing long-term information and short-term information as required by the second verifier, the method further comprising:

closing the second folder and leaving the first folder open prior to the presenting step if the short-term disposable certificate is presented by the subject to the first named verifier for authorization, wherein closing the second folder makes its contents not readable by the first named verifier.

* * * * *